United States Patent [19]

Howard et al.

[11] 4,360,850

[45] Nov. 23, 1982

[54] INTRINSICALLY SAFE ELECTROSTATIC ASSIST UNITS

[75] Inventors: Velmar E. Howard, Veddersburg, Ind.; Keith K. Klett, Danville, Ill.; Ernest A. Sammann, Urbana, Ill.; Joseph T. Verdeyen, Champaign, Ill.

[73] Assignee: HurletronAltair, Inc., Danville, Ill.

[21] Appl. No.: 89,309

[22] Filed: Oct. 30, 1979

[51] Int. Cl.³ .............................................. H02H 9/00
[52] U.S. Cl. ....................................... 361/56; 361/54; 361/55
[58] Field of Search ........................ 361/54, 55, 56, 57, 361/110, 111; 328/132

[56] References Cited

U.S. PATENT DOCUMENTS

| | | | |
|---|---|---|---|
| 2,928,956 | 3/1960 | Jones | 361/57 |
| 3,477,369 | 11/1969 | Adamson et al. | 101/153 |
| 3,517,265 | 6/1970 | Bradford | 361/56 X |
| 3,569,784 | 3/1971 | Carroll et al. | 317/16 |
| 3,579,036 | 5/1971 | McCoy | 361/57 |
| 3,619,720 | 11/1971 | Coberley | 361/86 |
| 3,725,739 | 4/1973 | Griffey | 361/57 |
| 3,777,216 | 12/1973 | Armstrong | 361/111 |
| 4,075,677 | 2/1978 | Bentley | 361/93 |
| 4,157,578 | 6/1979 | Gyursanszky | 361/111 X |

FOREIGN PATENT DOCUMENTS 427001  6/1967  Switzerland .

Primary Examiner—Reinhard J. Eisenzopf
Attorney, Agent, or Firm—Hill, Van Santen, Steadman, Chiara & Simpson

[57] ABSTRACT

A high-voltage crowbar circuit continually senses the load impedance and crowbars the output voltage applied to a load if the load impedance falls below a selected value. A differentiator circuit at the load senses variations in load voltage and can trigger the crowbar operation if the voltage variation as a function of time exceeds a preselected load.

33 Claims, 11 Drawing Figures

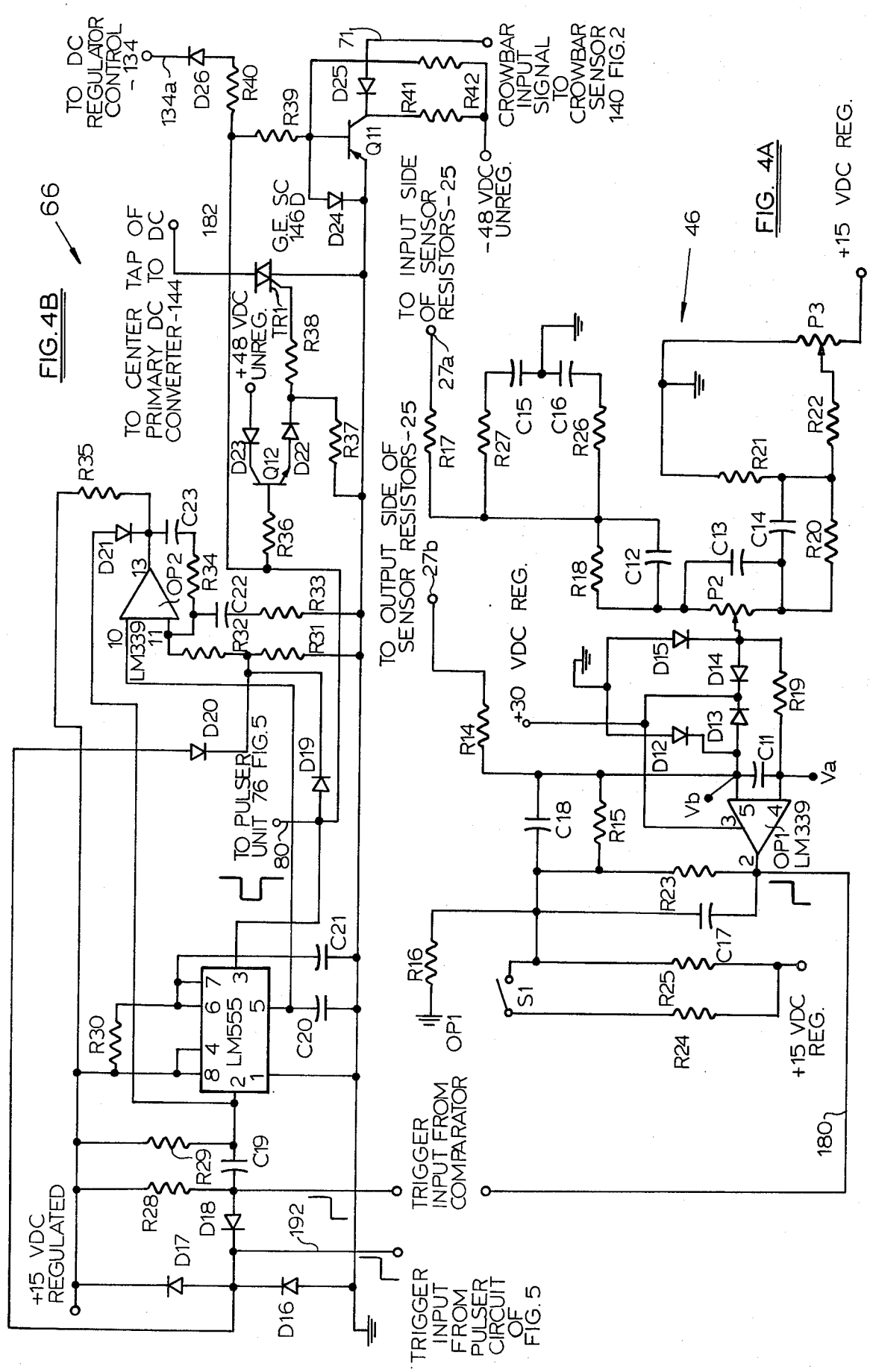

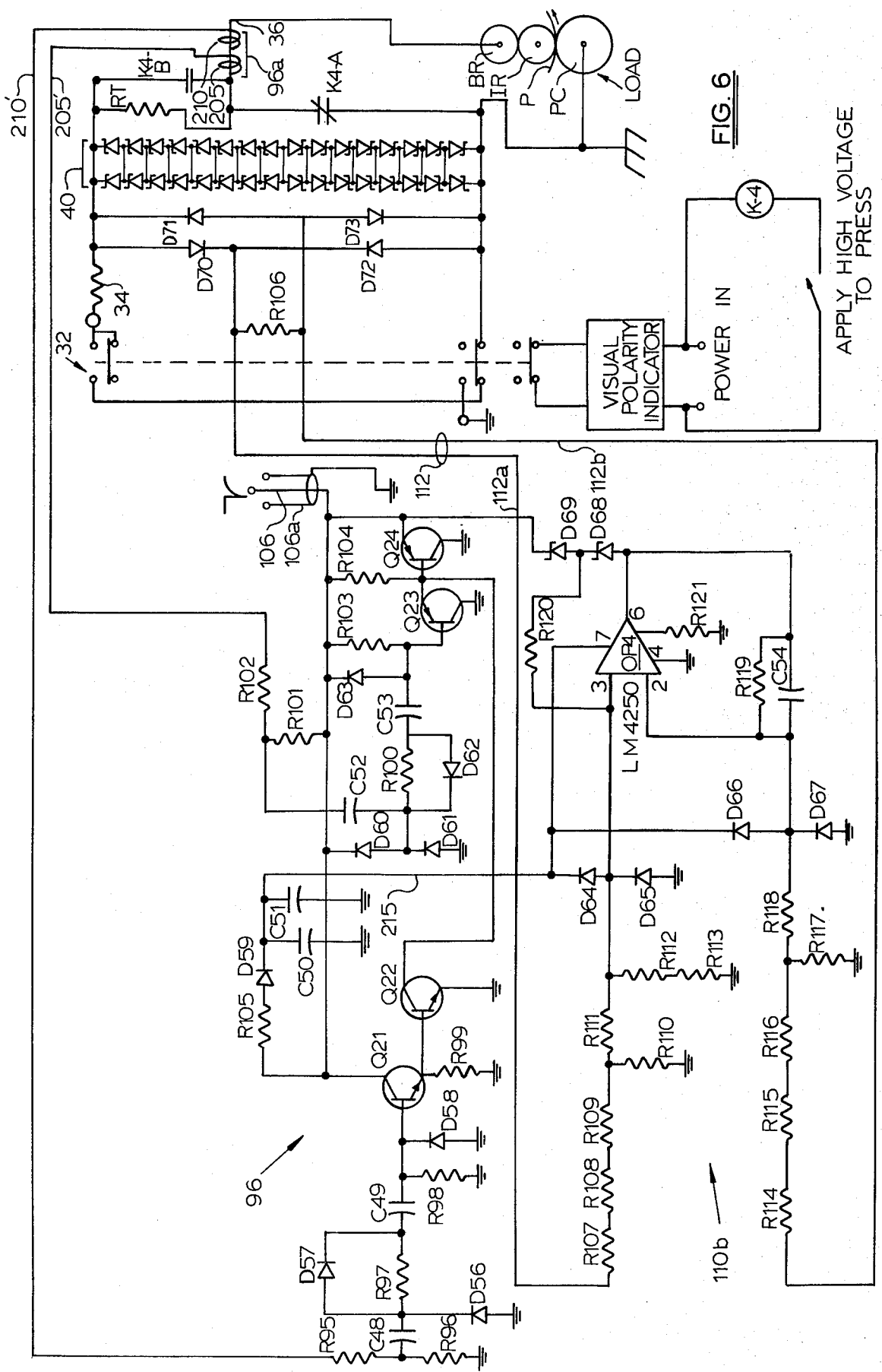

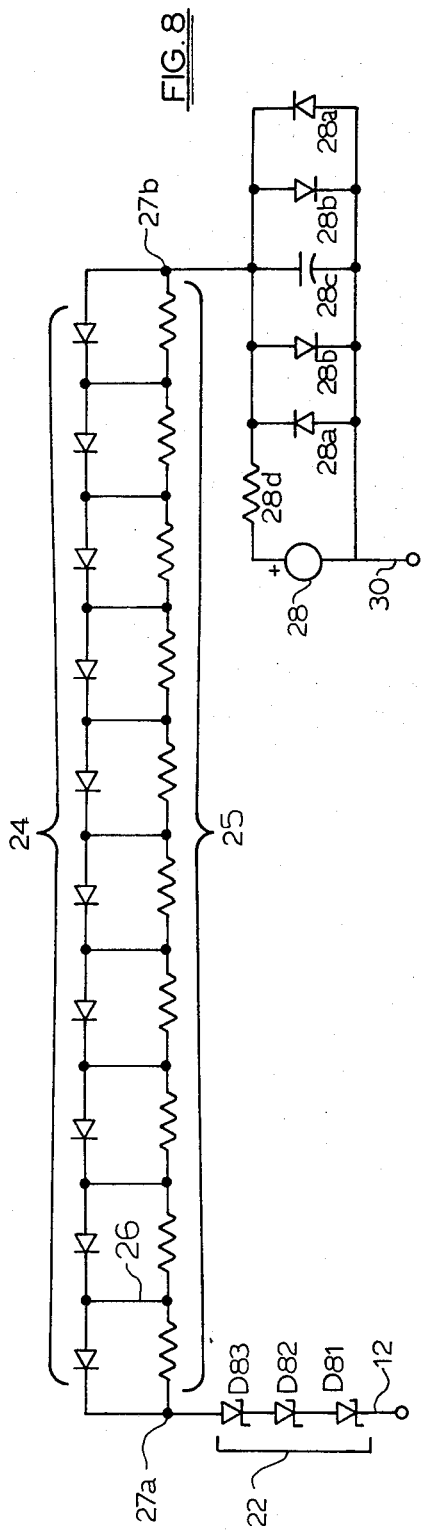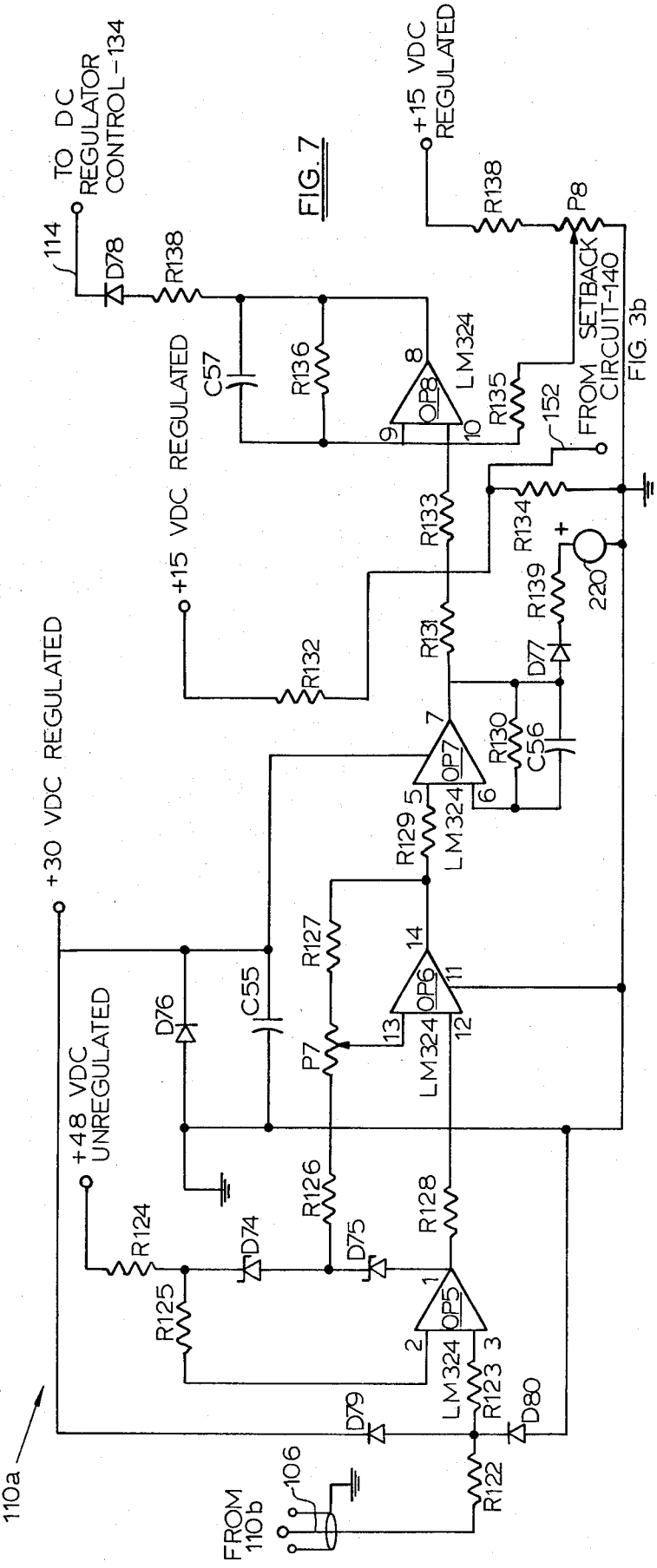

INTRINSICALLY SAFE ELECTROSTATIC ASSIST UNITS

BACKGROUND OF THE INVENTION

1. Field of the Invention

The invention pertains to crowbar circuits for use with high-voltage power supplies particularly for use in printing presses.

2. The Prior Art

It has been recognized that the quality of printing may in certain instances be improved by applying a d.c. voltage, on the order of several kilovolts, between a printing cylinder and an impression roller on a printing press. As the web or sheet material passes through a printing nip between the printing cylinder and the impression roller it is subjected to a strong electrostatic field. An example of one such system is disclosed in U.S. Pat. No. 3,619,720 which issued on Nov. 9, 1971.

A serious problem with applying such high voltages between the impression roller and the printing cylinder, which is normally grounded for safety, is that the impedance between the impression roller and the printing cylinder varies with the material passing through the nip. If the impedance drops excessively arcing results which, because of the vapors due to the links being applied to the web or sheet material, could cause an explosion. Thus, it is important to quickly shut down the high voltage when a decrease in load impedance is detected.

The '720 patent discloses a circuit which senses the load current flowing in a fixed resistor and when that current exceeds a threshold value, the circuit turns on a thyratron which crowbars the output voltage. The output voltage is driven to ground in about 10 microseconds. Experience with the system of the '720 patent has indicated that there exists a need for a faster crowbar system which is activated at lower load currents.

SUMMARY OF THE INVENTION

The invention includes a method and an apparatus practicing that method of removing a voltage applied to a load, such as a pair of rollers in a press which are applying ink to a web or sheet, if the load impedance falls below a selected value. The load impedance is sensed continually. The high-voltage generator which supplies high voltage to the load is shut down when the sensed load impedance drops below a selected threshold value. The voltage across the terminals of the high-voltage supply is simultaneously crowbarred to zero volts. Additionally, a rate of change of voltage with respect to time at the load is continually sensed and if a threshold rate of change of voltage is exceeded, the high voltage generator is shut down and the output voltage is again crowbarred to zero volts.

The inventive apparatus includes a high-voltage supply with two output terminals and with a control input terminal. Varying a signal applied to the control input terminal increases or decreases the output voltage. A sensor resistor is connected in series between one output terminal of the high-voltage supply and a terminal of the load. At least one impedance sensing circuit is connected in parallel with the sensor resistor. A logic unit is connected to an output of the impedance sensor. A pulser unit is connected to the logic unit. At least one thyratron with an anode and a cathode is connected in parallel with the output terminals of the power supply. The thyratron has a control grid connected to an output of the pulser unit. The logic unit is also connected to the control input terminal of the high-voltage supply.

The impedance sensor circuit continually senses the impedance of the load. When the load impedance decreases below a preselected value, it generates a signal that the logic unit senses. The logic unit signals the pulser unit which applies a control pulse to the grid of the thyratron. The thyratron is turned on in about 2 microseconds and performs a crowbar operation connecting the two output terminals of the power supply together. A second signal is simultaneously generated by the logic unit and applied to the control input terminal of the high-voltage supply to terminate generation of the output high-voltage.

The impedance sensor circuit includes a comparator which continuously senses the voltage between selected points on two voltage dividers. One divider is connected to each end of the sensor resistor. A decrease in the load impedance is reflected as a change in the two voltages sensed by the comparator. This change in load impedance is sensed essentially independent of the value of the load current. The comparator then generates the output signal sensed by the logic unit.

The pulser unit incorporates two transistors operating in the avalanche mode. The two transistors are driven from a non-conducting to a conducting state in an exceedingly short period of time. When the two transistors are driven into conduction, they apply a pulse to the grid of the thyratron driving it into conduction in about 2 microseconds.

A differentiator circuit, located adjacent the press is connected to the pulser unit in parallel with the logic sensor unit. The differentiator circuit can sense positive or negative transitions in the high-voltage being applied to the press. A signal generated by the differentiator and coupled to the pulser unit can also trigger the pulser unit causing it to crowbar the output voltage and to terminate generation of the high-voltage within the supply. In this case, the pulser unit also triggers the logic unit turning off the high voltage generator for a brief period of time.

The inventive apparatus also includes a setback circuit which, upon receipt of a signal from the logic unit, reduced by a known amount the output high voltage deliverable to the load. A variable resistance circuit then slowly increases the output voltage delivered to the load.

A plurality of impedance sensors, logic units, pulser units, differentiator units, and thyratrons may be used to improve system reliability.

The inventive method comprises the steps of:
continuously sensing the load impedance,
continuously sensing transitions of the load voltage,
driving a crowbar element into conduction if the load impedance falls or if the load voltage changes at an excessive rate,
shutting down generation of the high-voltage for a period of time, and
reapplying the load voltage after a selected time interval.

The inventive method can also include the steps of:
reducing the load voltage a selected amount in response to having shut down the high-voltage generator, and
increasing the load voltage relatively slowly.

BRIEF DESCRIPTION OF THE DRAWINGS

FIG. 4A is a detailed schematic of one of the impedance sensor units of FIG. 1.

FIG. 4B is a detailed schematic of one of the logic units of FIG. 1.

FIG. 6 is a detailed schematic of one of the Dv/Dt sensor units of FIG. 1 as well as a detailed schematic of the remote portion of the high-voltage feedback element.

FIG. 7 is a detailed schematic of the local portion of the high-voltage feedback element.

FIG. 8 is a detailed schematic showing the sensor resistors and diodes.

A DETAILED DESCRIPTION OF THE PREFERRED EMBODIMENTS

Not by way of limitation, but by way of disclosing the best mode of practicing our invention and by way of enabling one of ordinary skill in the art to practice our invention there is disclosed in FIGS. 1 through 9 one exemplary embodiment of our invention.

Figure 1:
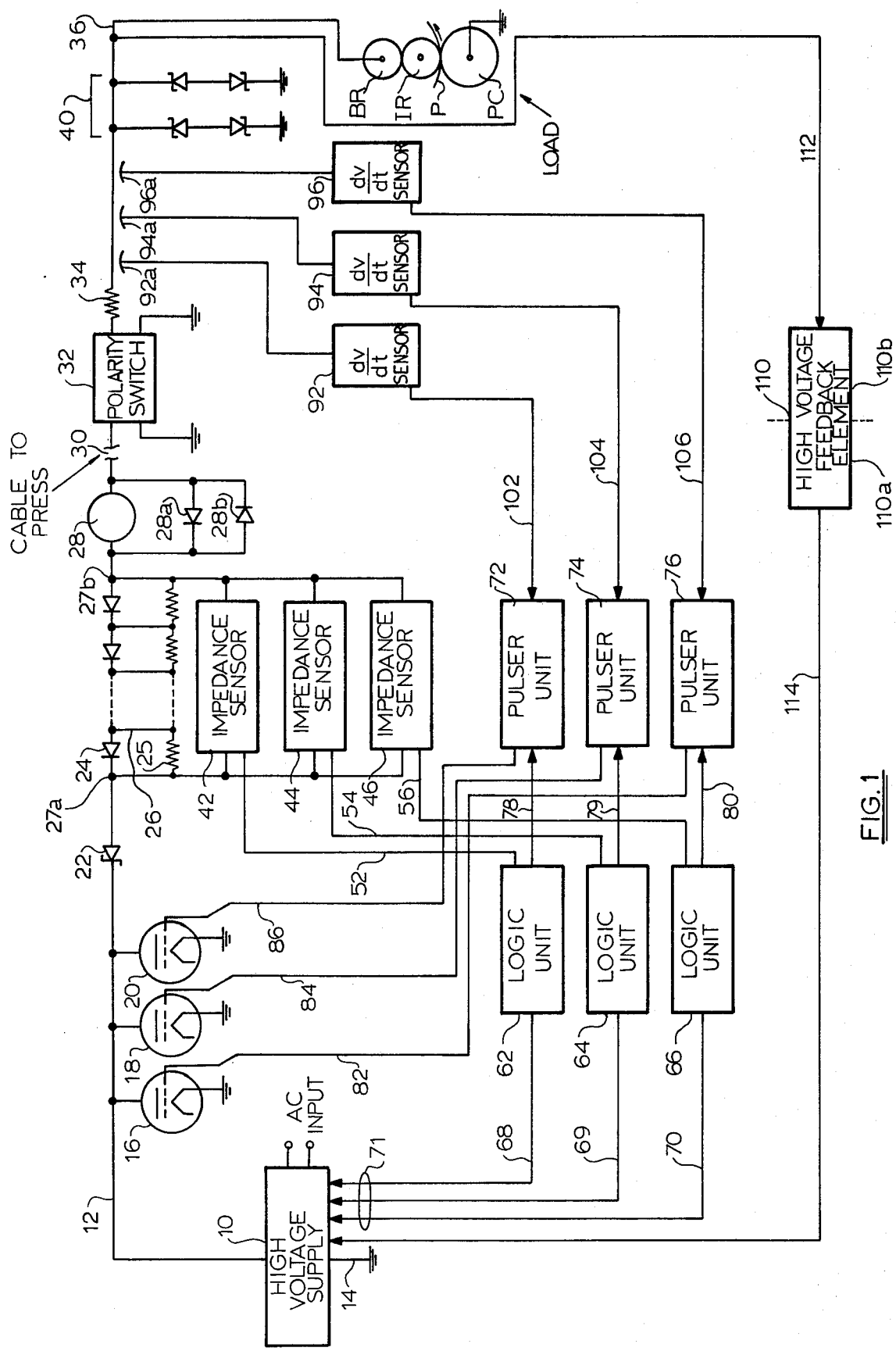
FIG. 1 is a schematic block diagram of a system incorporating the principles of the present invention.

FIG. 1, a system block diagram, discloses an exemplary high-voltage system incorporating the principles of our invention. In FIG. 1 a controllable high-voltage source 10 capable of producing direct voltages up to 7.5 kv has a high-voltage output line 12 and a common line 14. The high-voltage output line 12 is shunted by three thyratrons 16, 18 and 20. The thyratrons 16 through 20 perform the crowbar operation of the high, direct voltage on the line 12. A zener-diode 22 is shown in the line 12 and provides a controlled voltage drop between its anode and cathode so that the voltage on line 12 will always be sufficiently high so that the thyratrons 16 through 20 will operate properly.

In the line 12 of FIG. 1 is a parallel combination of a plurality of series connected shorting diodes 24 and a plurality of series connected current sensing resistors 25. Between each resistor 25 and an anode of the corresponding diode 24 is an electrical connection 26. In series with the parallel combination of shorting diodes 24 and current sensing resistors 25 is an ammeter 28 with protection diodes 28a and 28b, an output cable 30, a polarity reversing switch 32, and an isolation resistor 34. An output line 36 which provides a controlled output voltage, is connected to metal back-up roller BR in a printing press. The roller BR is in contact with an impression roller IR. The roller IR usually has a rubber covering. The paper or stock P being printed moves between the impression roller IR and a grounded printing cylinder PC. To insure that the output voltage on the line 36 does not exceed a specified maximum value, on the order of 2000 volts DC, a set of zener-diodes 40 is connected between the output line 36 and the ground line 14.

Three load impedance sensors 42, 44, 46 are each connected in parallel across the shorting diodes 24 and the sensor resistors 25, at the nodes 27a, b. The three sensors 42–46 provide redundant sensing means to sense the load impedance between the line 36 and the ground 14. The impedance sensors 42–46 are connected by a set of three lines 52, 54, 56 to a respective one of three logic units 62, 64, 66. Output lines 68, 69, 70 from each logic unit 62–66 are consolidated into a common cable 71 and provide a signal to a control input terminal to shut down the high-voltage supply 71 when one or more of the impedance sensors 42–46 detects that the load impedance has fallen below 200k ohms. Each of the logic units 62–66 is connected to a respective pulser unit 72, 74, 76 through an associated line 78, 79, 80. Each of the pulser units 72–76 is connected by a line 82–86 to a grid of a respective thyratron 16–20. Each of the thyratrons 16 through 20 can ground the output line 12 of the high-voltage supply 10 when pulses by its respective pulser circuit 72–76.

Additionally, each of three Dv/Dt sensors 92, 94, 96 is connected by a capacitive coupling 92a, 94a, 96a to the output line 36. Each Dv/Dt sensor 92–96 provides a signal on a line 102–106, respectively, indicating that the rate of change of voltage, Dv/Dt sensed on the output line 36 exceeds a preselected value.

A feedback element 110 has an input connected by a line 112 to the output line 36 and an output connected by a line 114 to the high-voltage source 10. The feedback element 110 closes the loop to enable the high-voltage supply to regulate the output voltage applied to the roller BR.

The purpose of the control system of FIG. 1 is to continually sense the energy available at the load on the line 36. If that energy exceeds one quarter of a millijouble, one or more of, the thyratron elements 16 through 20 will be triggered thereby reducing the output voltage on the line 12 of the high-voltage source 10 to essentially zero volts within a few microseconds. Because of the high-voltages involved, which are generated by the high-voltage source 10, triple redundancy is provided for each of the thyratrons 13–20, impedance sensors 42–46, the Dv/Dt sensors 92–96, the pulser circuits 92–96, and the logic units 62–66. It should be understood that the circuit of FIG. 1 would operate as described above even if it had only one impedance sensor element 42, one Dv/Dt sensor element 92, one pulser unit 72, and one logic input 62. The triple redundancy shown in FIG. 1 provides additional security in case any one of the elements fails. When triggered by any one of the pulser units 72 through 76, the associated thyratrons 16 through 20 conducts within 2 microseconds and grounds the output line 12. When one or more of the thyratrons 16 through 20 is conducting, the shunting diodes 24 conduct thereby providing a low impedance path to discharge any capacitively stored energy, in the circuit or in the load, to ground.

Figure 2:
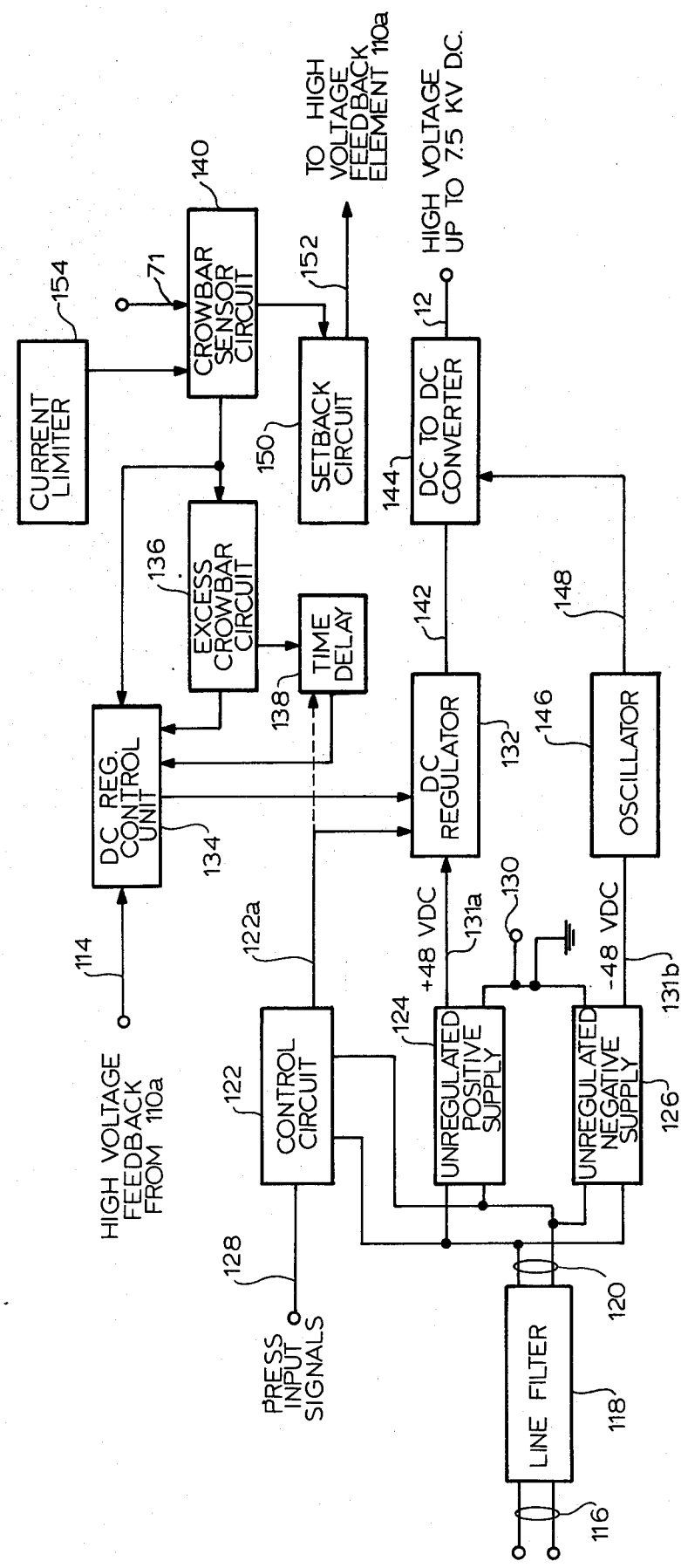
FIG. 2 is a block diagram schematic of the high-voltage supply of FIG. 1.

FIG. 2 is a block diagram of the high-voltage source 10 of FIG. 1. Standard a.c. line voltage is brought into the supply 10 at a pair of terminals 116 to a line filter 118. The line filter 118, on a pair of lines 120, provides input power to a control circuit 122, a positive supply circuit 124 and a negative supply circuit 126. The control circuit 122 can sense signals indicating the condition of the press. The press signals are connected by a line 128 and indicate the readiness and condition of the press. The signals on the lin 128, which are available from the press, are well known in the art and form no part of the present invention.

The power supply circuit 124 generates a positive 48 volt DC, unregulated signal, based on the input from the line filter 118 on the line 131a with respect to a ground line 130. The power supply circuit 126 generates a negative 48 volt DC unregulated signal with respect to the ground line 130. A series DC regulator circuit 132 senses a control signal from a regulator control circuit 134. If desirable, the regulator 132 could be shut down by a signal from the control circuit 122 on a line 122a if the press is not ready. The DC regulator control unit 134 receives signals from an excess crowbar circuit 136, from a time delay circuit 138, and from a crowbar sensor circuit 140. The DC regulator control unit 134 also receives a feedback signal on the line 114 from the high-voltage feedback element 110 to regulate the output voltage on the line 36.

When enabled by the control unit 134, the regulator 132 generates a regulated DC signal on a line 142 which is the input to a DC-to-DC converter 144. The DC-to-DC converter 144 converts the regulated, low-voltage signal, on the line 142 to a desired 7.5 kv direct voltage on the output line 12. An oscillator 146 which receives power from the rectifier circuit 126, provides a 1 kilohertz pulse stream on the line 148 to the DC-to-DC converter 144.

The input control circuit 122 receives information on press status such as go-down, impression-down, web break, and in turn energizes indicating lights on an operator panel, and inhibits the regulator 132 until the press is ready. The crowbar sensor circuit 140 senses crowbar signals on the line 71 which includes the lines 68 through 70. The crowbar sensor circuit 140 sends control signals to the DC regulator control unit 134, the excess crowbar circuit 136, and a set-back circuit 150. The excess crowbar detecting circuit 136 detects when the frequency of crowbars is excessive and if excessive it can energize the time delay 138. When the time delay 138 is energized, the DC regulator 132 is turned off for about 5 seconds. The time delay 138 can also be activated by input control circuit 122 when the power is first turned on.

The setback circuit 150 can, if enabled, reduce the voltage output on the line 12 a selected amount in response to a signal on the line 71. The setback circuit can then increase the output voltage on the line 12 slowly. The setback circuit varies the output voltage by means of a signal on a line 152 which is connected to a local part 110b of the high-voltage feedback element 110.

A current limiter circuit 154 senses the current flowing in the line 12 and can shut down the supply 10 if one of the thyratrons 16–20 triggers improperly.

Description of the High-Voltage Section of the Power Supply 10

Figure 3A:
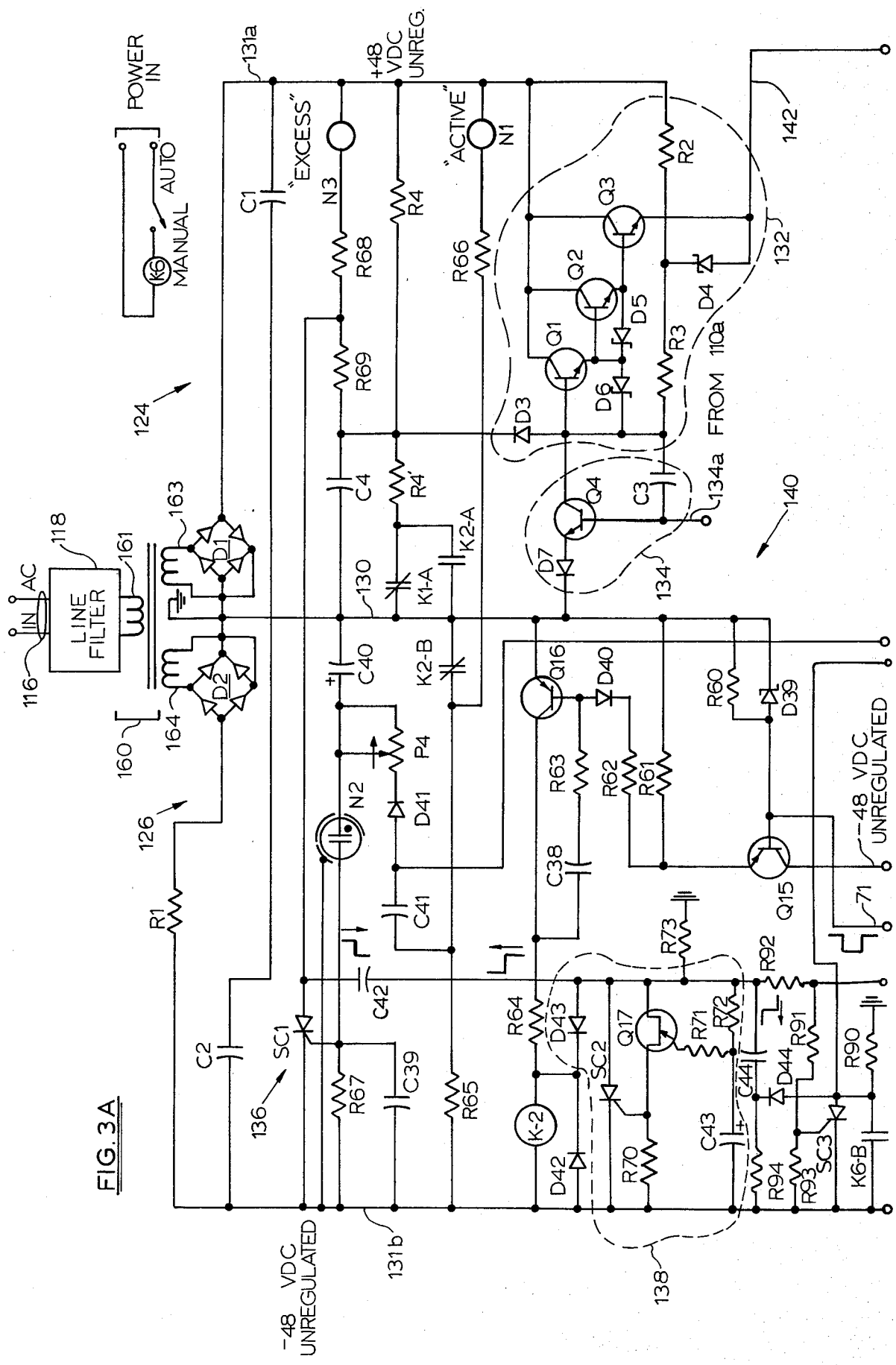
FIGS. 3A and 3B together represent a detailed schematic of the high-voltage supply of FIG. 1.
Figure 3B:
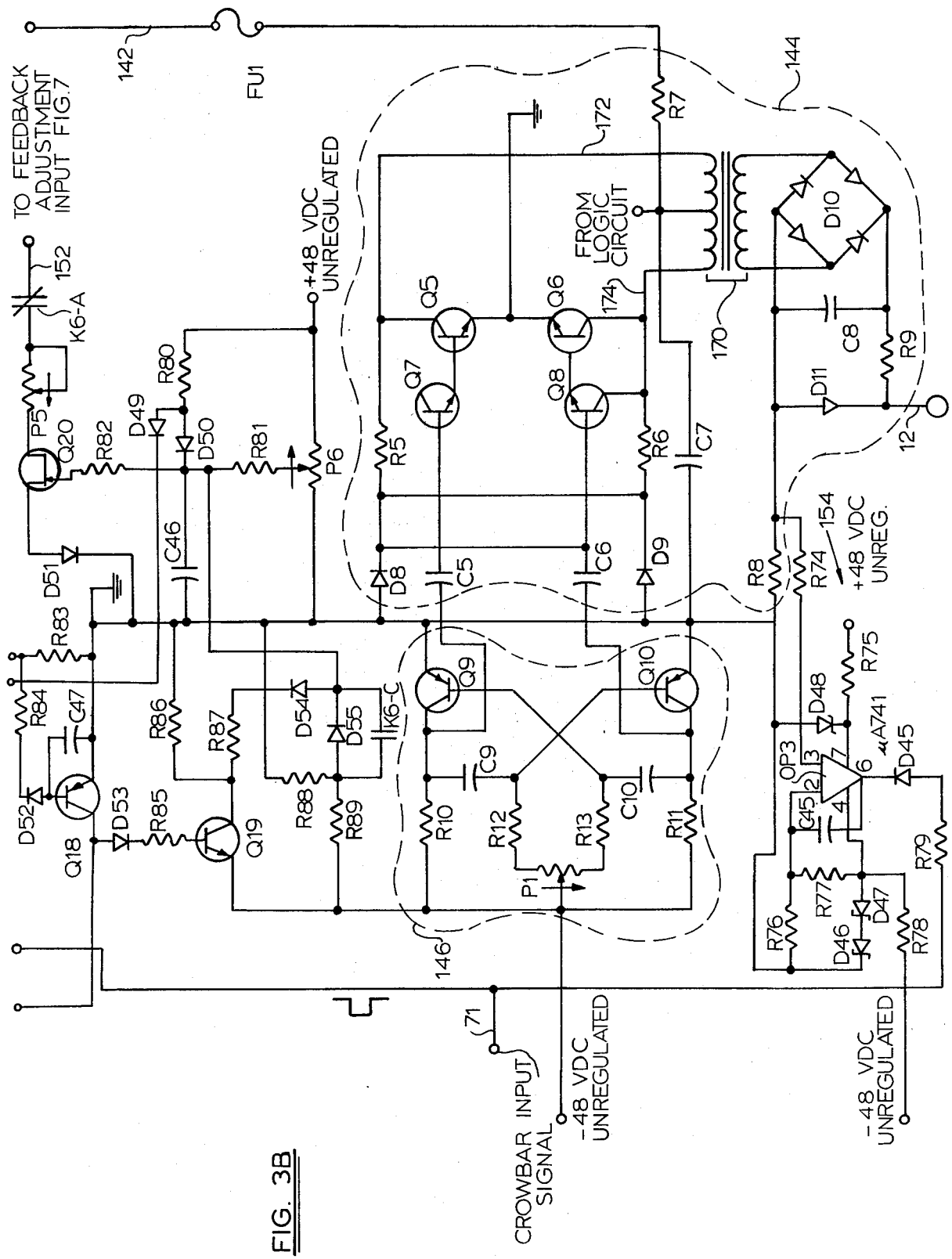

FIGS. 3a and 3b represent together a detailed schematic of the high-voltage supply 10 as shown as a block diagram in FIG. 2. A transformer 160 has a primary 161 fed from the line filter 118. The transformer 160 has a pair of secondaries 163, 164. The unregulated positive supply 124 includes the secondary 163, a bridge rectifier D1 and a filter capacitor C1. The unregulated negative supply 126 includes the secondary 164, a bridge rectifier D2, a current limiting resistor R1, and a filter capacitor C2. The secondary 163 supplies 32 volts AC to the full-wave bridge rectifier D1. The secondary 164 supplies 32 volts AC to the full-wave bridge rectifier D2. The bridge rectifier D1 is connected to the positive polarity output line 131a and the ground line 130. The bridge rectifier D2 is connected to the negative polarity output line 131b and the ground line 130. The filter capacitor C1 is connected between the high-voltage output line 131a of the rectifier D1 and the ground line 130. The current limiting resistor R1 is connected in series with the rectifier D2 and the negative output line 131b. The capacitor C2 is in turn connected between the ground line 130 and the low-voltage output line 131b.

The series DC regulator circuit 132 includes a set of three transistors Q1–Q3 connected in a Darlington configuration, a diode D3, three zener-diodes D4–D6 and two resistors R2, R3.

The DC regulator control unit 134 includes a transistor Q4, a diode D7 and a capacitor C3. The feedback high-voltage line 134a is connected between a first terminal of the capacitor C3 and a base of the transistor Q4. An emitter of the transistor Q4 is connected to an anode of the diode D7. A cathode of the diode D7 is connected to the ground line 130. The diode D7 is a reference diode. A collector of the transistor Q4 is connected to an anode of the diode D3, a base of the transistor Q1, a cathode of the zener-diode D6, a first terminal of the resistor R3 and a second terminal of the capacitor C2. A collector of the transistor Q1 is connected in parallel to a collector of the transistor Q2, a collector of a transistor Q3 and to the 48 volt DC line 131a. An emitter of the transistor Q1 is connected to a base of a transistor Q2, to an anode of the zener-diode D6 and to a cathode of the zener-diode D5. An emitter of the transistor Q2 is connected to an anode of the zener-diode D5 and to a base of the transistor Q3. An emitter of the transistor Q3 is connected to an anode of the zener-diode D4 and to the regulated DC output line 142. A cathode of the zener-diode D4 is connected between a first terminal of the resistor R2 and a second terminal of the resistor R3. A second terminal of the resistor R2 is connected to the unregulated 48 volt DC supply line 131a.

The output of the series regulator 132 is connected back to the base of the transistor Q through the zener-diode D4, and the resistors R2, R3. The zener-diode D4 along with the resistors R2, R3 supplies constant current to the input of the series regulator 132, as well as to the regulator control unit 134. As feedback on the line 134a is increased, the feedback transistor Q4 shunts a larger portion of the constant current away from the base input of the transistor Q1 thus lowering the output of the regulator 132 on the line 142.

A capacitor C4 and a resistor R4 form an RC circuit which limits the turn-on time of the regulator 132. The resistor R4 has a first terminal connected to the unregulated 48 volt DC line 131a and a second terminal connected to a cathode of the diode D3 and to a first terminal of the capacitor C4. The capacitor C4 has a second terminal connected to the ground line 130. If a normally closed relay constant pair K1-A is closed, the capacitor C4 will have essentially 0 volts across its terminals. In this condition, the diode D3 will clamp the base of the transistor Q1 of the Darlington combination Q1–Q3 at essentially 0 volts and hold the regulator 132 off. If the relay contact K1-A opens, the capacitor C4 will charge and the clamping diode D3 will follow, hence increasing the voltage at the base of the transistor Q1 permitting the regulator 132 to turn on. When the regulator 132 reaches stabilization the capacitor C4 will continue to charge and will eventually reverse bias the diode D3. The contacts K1-A can be controlled through the input control circuit 122 depending on the sensed conditions of the press.

With the regulator 132 regulating the 48 volt DC on the line 131a, a regulated signal is provided on the line 142 through a slow blow fuse Ful to the DC-to-DC converter 144.

The DC-to-DC converter 144 includes a high-voltage step-up transformer 170, a bistable multivibrator having a set of transistors Q5-Q8, capacitors C5, C6, resistors R5, R6 and biasing diodes D8, D9. The converter 144 also includes a current limiting resistor R7, a filter capacitor C7, a full-wave bridge output rectifier D10, a filter capacitor C8, a rectifier diode D11 and an overcurrent sensing resistor R8.

The output of the bistable multivibrator along a pair of lines 172, 174 alternately drives the primary of the step-up transformer 170. The amplitude of the pulse train applied to the primary of the transformer 170 is determined by the output voltage on the line 142 from the DC regulator 132. The high-voltage output on the secondary of transformer 170 is rectified by the bridge rectifier D10 and filtered by the capacitor C8 which is connected across the bridge rectifier D10. A resistor R9 connected in series between the output of the bridge rectifier D10 and the high-voltage output line 12 is a current limiting resistor which protects the DC-to-DC converter 144 during the crowbar operation.

The DC-to-DC converter 144 is driven by the oscillator 146, which is an astable multi-vibrator having an operating frequency of approximately 1000 hertz. The oscillator 146 includes a pair of transistors Q9, Q10, feedback capacitors C9, C10 and resistors R10-R13. A potentiometer P1 provides an adjustment mechanism. The multi-vibrator 146 is a free-running multi-vibrator and its output pulse stream is coupled by the capacitors C5, C6 to the bistable multi-vibrator made up of the transistors Q5-Q8. The output pulse train coupled generated by the astable oscillator 146 switches between a negative voltage on the order of minus 48 volts DC and ground.

Description of Impedance Sensing Circuit

As shown in FIG. 1, there are three identical impedance sensing circuits 42, 44, 46 connected across a plurality of sensing resistors 25. Each of the circuits 42 through 46 senses whether or not the impedance of the load is adequately high. The circuits 42 through 46 operate in parallel. FIG. 4A is a schematic of the impedance sensor circuit 46. Each of the impedance sensor circuits 42 through 46 includes an operational amplifier OP1 connected as a comparator, resistors R14-R27, capacitors C11-C18, diodes D12-D15, potentiometers P2, P3 and a switch S1.

The operational amplifier OP1 continuously compares the two voltages Va, Vb to one another. When the voltage Va changes with respect to Vb, this is an indication that the load impedance has fallen below 200 k, essentially independently of the output voltage and output current on the line 36. The output, on pin 2, of the comparator OP1 immediately falls from about 30 volts to ground. The output from the operational amplifier OP1 will stay low until the load impedance again increases to about 200 k ohms.

In the impedance sensor circuit 46, a first terminal of the resistor R17 is electrically connected to the anode of the zener-diode 22, corresponding to the node 27a of FIG. 1. This provides one of the two connections to the impedance sensor 46. A first terminal of the resistor R14 is connected to the node 27b located between the sensing resistors 25 and the milliammeter 28 of FIG. 1. This provides a second connection to the impedance sensor 46. A second terminal of the resistor R17 is connected to a first terminal of the resistor R18, a first terminal of the resistor R26, a first terminal of the resistor R27 and a first terminal of the capacitor C12. A second terminal of the resistor R27 is connected to a first terminal of the capacitor C15. A second terminal of the capacitor C15 is connected to the electrical ground. A second terminal of the resistor R26 is connected to a first terminal of the capacitor C16. A second terminal of the capacitor C16 is connected to the electrical ground. A second terminal of the resistor R18 is connected to a second terminal of the capacitor C12, a first terminal of the capacitor C13 and a first fixed terminal of the potentiometer P2. A second fixed terminal of the potentiometer P2 is connected to a second terminal of the capacitor C13, a first terminal of the capacitor C14 and a first terminal of the resistor R20. A second terminal of the capacitor C14 is connected to a second terminal of the resistor R20, to a first terminal of the resistor R21, and to a first terminal of the resistor R22. A second terminal of the resistor R22 is connected to electrical ground. A second terminal of the resistor I6 is connected to a variable input point of the potentiometer P3. A first fixed terminal of the potentiometer P3 is connected to electrical ground. A second fixed terminal of the potentiometer P3 is connected to a regulated 15 volt supply. A variable input terminal of the potentiometer P2 is connected to a cathode of the diode D14, an anode of the diode D15 and a first terminal of the resistor R19. An anode of the diode D15 is connected to electrical ground. A cathode of the diode D14 is connected to a regulated 30 volt supply. A second terminal of the resistor R19 is connected to a first terminal of the capacitor C11 and a first input pin 4 of the comparator OP1. An anode of the diode D13 is connected to a cathode of the diode D12, a second terminal of the capacitor C11, a second input, pin 5, of the comparator OP1, a first terminal of the resistor R15, a second terminal of the resistor R14 and a first terminal of the capacitor C18. A second terminal of the capacitor C18 is connected to a second terminal of the resistor I5, a first terminal of the resistor R15, a first terminal of the capacitor C23, a first terminal of the resistor R16, a first terminal of the switch 51 and a first terminal of the resistor R25. A second terminal of the resistor R23 is connected to an output point, pin 2 of the comparator OP1, and a second terminal of the capacitor C17. A second terminal of the resistor R16 is connected to electrical ground. A second terminal of the resistor R25 is connected to a first terminal of the resistor R24 and to the regulated 15 volt DC supply. A second terminal of the resistor R24 is connected to a second terminal of the switch 51.

During normal operation, power is conducted to the load through the sensing resistors 25 with the sensing diodes 24 being reverse biased. Each of the sensing resistors 25, of which there are 10, has a value of 100 k ohms at 1 watt. Across each of the sensing resistors 25 there is a sensing diode, of which a type 1N2071 is acceptable. If any of the sensing resistors 25 should become short circuited, it will not affect operation of the circuit. Similarly, if any of the resistors 25 become open-circuited, because each of them is connected in parallel with a sensing diode 24 by one of the lines 36, this too will not affect operation of the circuit. In fact, each of the impedance sensing elements 42 through 46 becomes more sensitive if any of the resistors 26 becomes an open-circuit or increases in value. Additionally, because each of the resistors 25 shunts each of the diodes 24, the voltage drop across any of the diodes 24 is one tenth of the total drop between the nodes 27a and 27b. This thus limits the voltage applied to any individual diode 24 protecting each of them against reverse break-down.

In the impedance sensing circuit of FIG. 4A, the resistors R14, R15, R25 and R23 establish the voltage Vb. The resistors R17, R18, R20, R21, R22 and potentiometers P2, P3 establish the voltage Va. The comparator OP1 compares Va, to Vb to determine whether or not the load impedance has fallen below an acceptable value. When the impedance at the load is high enough, the output voltage from the comparator, at pin 2, is just about equal to 30 volts DC. When the comparator senses a drop in impedance at the load, below 200 kv, its output voltage goes to ground on a line 180 providing a signal which eventually may be used to trigger one or more of the thyratrons 16 through 20. If the values of the circuit of FIG. 4A are used, and if the isolation resistor 34 is selected to have a value equal to 500 k ohm and if the sensing resistors 25 are each taken to be 100 k ohm as discussed previously, a short circuit at the load may be detected with only 82 microamps flowing through that fault. This is a low enough value of current so that there will not be a steady ionization at the fault point.

The capacitors C12–C18 and resistors R26, R27 and any stray capacitance around resistors R14, R17 are used to improve the frequency response of the circuit. Resistors R21, R22 and potentiometer P3 are used to null the offset voltage of the comparator OP1. When nulling out the offset voltage, the switch S1 is opened. When the switch is closed, a known offset voltage is applied through the resistors R24, R16. Two offset supplies are used as the sign of the offset of OP1 is not known ahead of time. The diodes D12–D15 are used for transient protection. Capacitor C11 improved noise immunity of the circuit. Capacitor C17 and resistor R23 supply a small amount of hysteresis to prevent oscillation when the differential voltage at the input to the comparator OP1 is small. Resistor R19 is used to reduce the effects of comparator bias current on the offset voltage by making the source resistances equal in the two comparator networks. The comparator OP1 has an open collector output stage and as noted previously, upon detection of a fault or a drop in the load impedance, the output voltage at pin 2 of the comparator OP1 will fall from about 30 volts to ground.

A further discussion of the operation of the impedance sensor of FIG. 4A will be found near the end of this specification.

Description of the Logic Unit

FIG. 4B is a schematic of the logic block 66 of FIG. 1. Each of the logic blocks 62 through 66 is identical and each senses a low going signal from its associated impedance sensor, 42 through 46, and generates a signal which triggers its associated thyratrons 16 through 20 to crowbar the high-voltage on the line 12 to essentially ground. Each of the logic units 62 through 66 also provides control signals to the high-voltage supply 10 along the lines 68 through 70 turning off the source of the high-voltage.

As shown in FIG. 4B, the logic unit 66 includes an LM 555 timer, a plurality of diodes D16–D26, a plurality of resistors R28–R42, a plurality of capacitors C19–C23, transistor Q11, a triac TR1 and a comparator OP2.

In the logic unit 66, an anode of the diode D16 is connected to electrical ground. A cathode of the diode D16 is connected to an anode of the diode D17 and an anode of the diode D20 and a cathode of the diode D18. A cathode of the diode D17 is connected to +15 volts DC. An anode of the diode D18 is connected to a first terminal of the resistor R28 and a first terminal of the capacitor C19. A second terminal of the capacitor C9 is connected to a first terminal of the resistor R29 and to an input point, pin 2, of the LM 555 timer. A second terminal of the resistor R28 and a second terminal of the resistor R29 are connected to +15 volts DC. The input pin 2 of the LM 555 timer is also connected to an anode of the diode D21.

The pulse width output by the LM 555 timer on an output pin 3 is determined by the 0.01 microfarad capacitor C21 and the 1 megohm resistor R30. The output pulse width with the indicated values of resistance and capacitor corresponds to 0.01 seconds. The output voltage goes from essentially 0 volts to 15 volts and then back to 0 volts after 0.01 seconds. An output point, pin 3, of the LM 555 timer is connected to an anode of the diode D19, a first terminal of the resistor R36, a first terminal of the resistor R39 and a first terminal of the resistor R40. A cathode of the diode D19 is connected to a first terminal of the resistor R31, a first terminal of the resistor R32 and a cathode of the diode D20. A first terminal of the capacitor C20 is connected to pin 5 of the LM 555 counter and to a first input of the second comparator OP2. A second terminal of the capacitor C20 is connected to electrical ground. A second terminal of the resistor R31 is connected to electrical ground. A second terminal of the resistor R32 is connected to a second input, pin 11, of the second comparator OP2, to a first terminal of the capacitor C22 and a first terminal of the resistor R34. A second terminal of the capacitor C22 is connected to a first terminal of the resistor R33. A second terminal of the resistor R33 is connected to electrical ground. A second terminal of the resistor R34 is connected to a first terminal of the capacitor C23. A second terminal of the capacitor C23 is connected to an output point, pin 13, of the second comparator OP2, to the cathode of the diode D21, and to a first terminal of the resistor R35. A second terminal of the resistor R35 is connected to +15 volts DC. A second terminal of the resistor R36 is connected to a base input of the transistor Q1.

An emitter of the transistor Q12 is connected to an anode of the diode D29. A cathode of the diode D22 is connected to a first terminal of the resistor R37, and a first terminal of the resistor R38. A second terminal of the resistor R37 is connected to electrical ground. A second terminal of the resistor R38 is connected to a gate input of Triac TR1. A collector of the transistor Q12 is connected to a cathode of the diode D23. An anode of the diode D23 is connected to unregulated 48 volts DC. A first power terminal of the triac TR1 is connected to electrical ground. A second power terminal of the triac TR1 is connected to the center top of the primary transformer in the DC converter 144 of the high-voltage supply 10 of FIG. 3. A second terminal of the resistor R39 is connected to an anode of the diode D24, a base of the transistor Q11 and to a first terminal of the resistor R42. A cathode of the diode D24 is connected to electrical ground. An emitter of the transistor Q11 is connected to electrical ground. A collector of the transmitter Q11 is connected to a first terminal of the resistor R41 and to a cathode of the diode D25. A second terminal of the resistor R41 and a second terminal of the resistor R42 are connected to −48 volts, unregulated DC. An anode of the diode D25 is connected to the high-voltage supply of FIG. 3. A signal going to ground on the line 71 indicates that a crowbar has taken place.

The output, pin 2, of the comparator OP1 of FIG. 4A, the impedance sensor circuit, is connected to the logic unit of FIG. 4B by a line 180. A down-going signal on the line 180 is coupled by the capacitor C19 to the input terminal, pin 2, of the LM 555 timer. This down-going signal triggers the LM 555 timer which generates the 15 volt pulse approximately 0.01 seconds wide on its output terminal, pin 3. The positive going pulse on the output terminal on the LM 555 timer is coupled to the pulser unit 76 on the line 80. Additionally, the positive going 15 volt pulse on pin 3 is coupled through the resistor R36 to the base of the transistor Q12 turning the transistor Q12 on. A positive going voltage on the emitter of the transistor Q12 provides a signal to drive the gate input of the triac TR1. The triac TR1 switches to its conducting state and grounds the output line 182 going to the primary of the center tap of the high-voltage transformer 170 of the converter 144 in the high-voltage supply. Additionally, the positive going 15 volt pulse on the output of pin 3 is coupled through the resistor R40 and the diode R26 and provides base drive to the shunt transistor Q4 of FIG. 3 thereby shunting down the series regulator 132 of the high-voltage supply 10. With the series regulator 132 of the high-voltage supply 10 shut down, the triac TR1 also turns off. Finally, the positive going 0.01 second pulse on the output of pin 3 of the LM 555 timer coupled through the resistor R39 turns off the transistor Q11 applying a negative going voltage through the diode D25 to the crowbar sensor circuit 150 on the line 71.

At the end of 0.01 seconds, the LM 555 resets itself and pin 3 again has an output signal of essentially zero volts. If a fault indication still exists, there will be a zero volt signal still on the output, pin 2, of the comparator OP1 of FIG. 4A. The low voltage on the line 180 in turn clamps the anode of the diode D18 essentially to ground. As a result, the voltage at the input, pin 11, of the second comparator OP2, will go low enabling that comparator to change state. When the comparator OP2 changes state, its output terminal, pin 13, goes low thereby retriggering the LM 555 counter through the diode D21. A slight delay is built into this retriggering feature. The delay is dependant upon the values of the resistor R32, and the capacitors C22, C23. The capacitor C23 also provides some hysteresis to prevent oscillations near the switching threshold.

Figure 5:
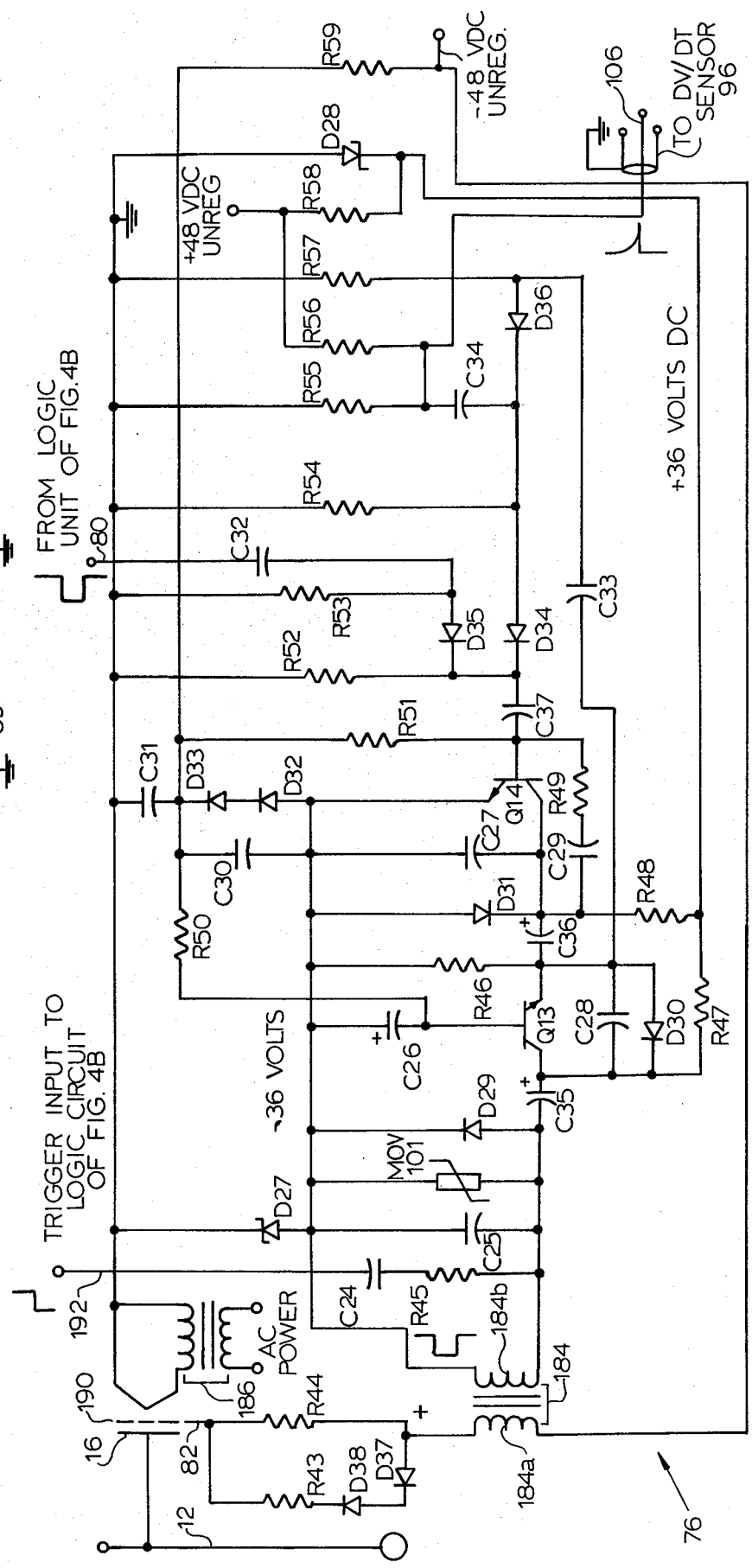
FIG. 5 is a detailed schematic of one of the pulser units of FIG. 1.

Description of the Pulser Unit of FIG. 5

FIG. 5 is a schematic of the pulser unit 76 of FIG. 1. The pulser units 72, 74 are identical to the pulser unit 76. Each of the pulser elements 72 through 76 receives signals on the lines 102 through 106 from the Dv/Dt sensors 92 through 96 which indicate that the rate of change of voltage on the line 36 is excessive. Additionally, the pulsers 72 through 76 receive signals on the lines 78 through 80 from the logic units 62 through 66 indicating that the thyratrons 16 through 20 should be switched to their conducting state. Each pulser unit 72 through 74 will switch its associated thyratron 16 through 20, into the conducting state if either a drop in load impedance is sensed or if an increase or decrease in the Dv/Dt of the output voltage on the line 36 is sensed. Each of the pulser units 72 through 76 is identical and corresponds in structure to the schematic of FIG. 5.

The pulser unit 76 includes a pair of transistors Q13, Q14, a pair of zener-diodes D27, D28, diodes D29–39, a plurality of resistors R43–R59, a plurality of capacitors C24–C37, a metal oxide varister MOV101, a pulse transformer 184 and a filament transformer 186.

The fillament transformer 186 is connected with its primary supplied with 115 volts AC power and with its secondary connected across the fillament of thyratron 16. A grid 190 of the thyratron is connected by the line 82 to a first terminal of the resistor R43 and to a first terminal of the resistor R44. A second terminal of the resistor R43 is connected to a cathode of the diode D38. An anode of the diode D38 is connected to a cathode of the diode D37. An anode of the diode D37 is connected to a second terminal of the resistor R44, and a first terminal of a secondary 184a of the pulse transformer 184. A second terminal of the secondary 184a of the pulse transformer 184 is connected to −48 volts unregulated DC. A first terminal of the primary 184a of the pulse transformer 184 is connected to an anode of the zener-diode P27, a first terminal of the capacitor C25, a first terminal of the metal oxide varister MOV101, a cathode of the diode D29, a first terminal of the capacitor C26, a first terminal of the resistor R46, an anode of the diode D31, a first terminal of the capacitor C27, a first terminal of the capacitor C30, an emitter of the transistor Q14 and an anode of the diode D32. A second terminal of the primary 184a of the pulse transformer 184 is connected to a first terminal of the resistor R45, a second terminal of the capacitor C25, a second terminal of the metal oxide varister MOV101, an anode of the diode D29 and a first terminal of the capacitor C35. A second terminal of the resistor R45 is connected to a first terminal of the capacitor C24, a second terminal of the capacitor C24 is connected to a line 192 to provide an input to the logic circuit of FIG. 4B. A cathode of the zener-diode D27 is connected to electrical ground. A second terminal of the capacitor C26 is connected to a base of the transistor Q13 and a first terminal of the resistor R50. A second terminal of the capacitor C35 is connected to a collector of the transistor Q13, a first terminal of the capacitor C28, a cathode of the diode D30, and a first terminal of the resistor R47. An emitter of the transistor Q13 is connected to a second terminal of the resistor R46, a first terminal of the capacitor C36, a second terminal of the capacitor C28, an anode of the diode D30, and a first terminal of the capacitor C33. A second terminal of the capacitor C36 is connected to a cathode of the diode D31, a first terminal of the capacitor C29, a first terminal of the resistor R48, a second terminal of the capacitor C27, and a collector of the transistor Q14. A second terminal of the resistor R48 is connected to a second terminal to a resistor R47, a first terminal of the resistor R58 and to a cathode of the zener diode D28. A second terminal of the capacitor C29 is connected to a first terminal of the resistor R49. A base of the transistor Q14 is connected to a second terminal of the resistor R49, a first terminal of the capacitor C37 and to a first terminal of the resistor R51.

A second terminal of the capacitor C37 is connected to an anode of the diode D34, an anode of the diode D35 and a first terminal of the resistor R52. An anode of the diode D34 is connected to a first terminal of the resistor R54, a first terminal of the capacitor C34 and a cathode of the diode D36. An anode of the diode D34 is connected to a first terminal of the resistor R53, and a first terminal of the capacitor C32. A second terminal of the capacitor C32 is connected to the line 80 which receives positive going input pulses from the logic unit of FIG. 4B. A second terminal of the resistor R53 is connected to electrical ground. A second terminal of the resistor R52 is connected to electrical ground. A cathode of the diode D32 is connected to an anode of the diode D33. A second terminal of the resistor R50 is connected to a second terminal of the capacitor C30, a cathode of the diode D32, a first terminal of capacitor C31, a second terminal of the resistor R51, and a first terminal of the resistor R59. A second terminal of the capacitor C31 is connected to electrical ground. A second terminal of the resistor R54 is connected to electrical ground. A second terminal of the capacitor C34 is connected to a first terminal of the resistor R55, a first terminal of the resistor R56, and to the line 106 which connects the pulser unit 76 to the Dv/Dt sensor 96. A second terminal of the resistor R56 is connected to a second terminal of the resistor R56 and to the positive 48 volt unregulated DC supply. A second terminal of a capacitor C33 is connected to an anode of the diode D36 and a first terminal of the terminal R57. A second terminal of the resistor R57 is connected to electrical ground.

The pulser unit 76 of FIG. 5 incorporates two transistors Q13 and Q14 as very high speed, high power switches. The transistors Q13, Q14 are operated in the avalanche mode by biasing them near their breakdown voltage and are quickly driven into conduction by the application of appropriate emitter-base voltages. The associated circuitry is carefully designed to limit the conduction current and duration to safe values for these transistors. These transistors can produce pulses on the primary 184b of the pulse transformer 184 having peak powers near 70 watts, rise times of less than 20 nanoseconds and durations of several microseconds. In the pulser unit 76, two capacitors C35 and C36 are charged in parallel so that each of them develop a voltage having a plurality as indicated in FIG. 5 on the order of 72 volts. The capacitor C36 is charged through the resistor R48 and receives power from a regulated 36 volt supply formed of the zener-diode D28 and the resistor R58. The charging path for the capacitor C36 also includes the resistor R46 which is connected to the anode of the diode D27, a negative 36 volt regulated supply. Thus, C36 has approximately 72 volts across it at one full charge. Similarly, C34 is charged by the positive 36 volt supply of the cathode of D28 through the resistor R47, the diode D29 and the negative 36 volt power supply at the anode of the zener-diode 27. Thus, the capacitor C35 also has approximately 72 volts across it.

When a positive going signal is applied to the line 80 by the logic unit 66, that signal is coupled through the capacitor C32 and the diode D35 onto the base of the transistor Q14. When the transistor Q14 starts to conduct, the capacitor C27 across its collector emitter junction provides initial energy to produce avalanche breakdown in the transistor Q14. This insures that Q14 turns on very fast and in the avalanche mode. When Q14 breaks down and starts to turn on, the 72 volts which has been charged on the capacitor C36 is added to the 72 volts on the capacitor C35 so that the non-conducting transistor Q13 now has approximately 140 volts between its emitter and its collector. This voltage is more than enough to trigger Q13 into the avalanche conduction mode. The capacitor C28 between the emitter and collector of the transistor Q13 provides additional energy to insure that it too turns on only in the avalanche mode. As the transistor Q13 starts to break down, the emitter based junction of the transistor Q14 is driven hard in the conduction by the capacitor C26 and it is held on by the resistor R50. Once the transistor Q13 starts to conduct the network of the capacitor C29 and the resistor R49 provides current through the base emitter junction of the transistor Q14 to drive the transistor Q13 hard into the avalanche mode.

A negative going signal may be supplied by the Dv/Dt sensor 96 through the line 106 and is coupled through the capacitor C34, diode D36, capacitor C33 and onto the emitter of the transistor Q13. With this alternate source of input, when the emitter of the transistor Q13 is driven negative, it will start to avalanche thereby turning on the transistor Q14 and repeating the process previously described.

When the two transistors Q13, Q14, are turned on, a pulse on the order of 140 volts is applied across the primary 184b of the pulse transformer 184. The pulse transformer 184 has a 10:1 turns ratio. When the positive going pulses applied across the primary 184b it is coupled through the secondary 184a and into the grid circuit of the thyratron 16. A positive voltage, on the order of 200 volts, appears in the secondary circuit at the anode of the diode D37. This positive going signal triggers the thyratron 16 causing it to crowbar the output voltage on the line 12. After the capacitors C35 and C36 discharge, the avalanche transistors Q13 and Q14 turn off. The diodes D 32 and D33 provide reverse bias to the base emitter junction of the transistors Q13 and Q14 insuring that those transistors stay turned off until a desired signal has been sensed on the line 80 or on the line 106. By heavily overdriving the grid 190 of the thyratron 16 by applying several hundred volts to the secondary circuit, the turn-on time of the thyratron is reduced from 10 microseconds to about 2 microseconds.

The capacitor C25, the varistor MOV101 are both utilized to suppress any inductive kick which might occur across the primary coil 184b of the pulse transformer 184.

Additionally, the diode elements D29, D30, and D31 are used to protect the transistors Q13, Q14 from kickback from the thyratron 16.

The line 106 which links the pulser unit 76 to the Dv/Dt sensor 96 has two functions in common with each of the other lines 102, 104 which link the pulser units 72, 74 to the Dv/Dt sensors 92, 94. These two functions are to supply power to the remote Dv/Dt sensors, namely a positive unregulated 30 volts through the resistor R56 which will provide enough power at the remote sensor unit to operate it. Secondly, to provide a return path for the negative going signal from the Dv/Dt sensor such as the sensor 96 which as discussed previously is coupled through the capacitor C34, the diode D36, the capacitor C33 and onto the emitter of the avalanche transistor Q13.

Additionally, one of the three lines 102 through 106, provides a relatively slow moving feedback signal from a remote portion 110b of the high-voltage feedback element 110 to a local portion 110a of the high-voltage feedback element. In the present case, the feedback signal is associated with the line 106. The DC value of the voltage on that line is approximately 11 volts+1/500 of the high-voltage output on the line 36. In the case of the other two lines, 102, 104 which do not have the DC high-voltage feedback signal associated therewith, the output voltage on the lines 102, 104 is on the order of positive 30 volts unregulated DC unless the associated Dv/Dt sensor 92 or 94 is transmitting a negative going pulse to ground to the pulser unit 72 or 74.

The lines 102–106 can be coaxial cables. With respect to the line 106, the resistor R54 serves as a terminating resistor. Each of the thyratrons can be a type 5557.

Description of the Crowbar Sensor Unit and the Excess Crowbar Circuit of FIG. 3a The crowbar sensor circuit 140 receives a negative going input pulse having a width of 0.01 seconds from one or more of the three logic units 62 through 66 whenever one of the thyratron units 16 through 20 has been fired. In FIG. 1, a set of three lines 68 through 70 is shown emanating from the logic units 62 through 66. These three lines may be connected together in parallel so that only the single line 71 needs to be connected between the crowbar sensor circuit 140 and the logic circuits 62 through 66. An additional input to the crowbar sensor circuit 140 comes from the current limiter circuit 154. The current limiter circuit 154 senses whether or not the high-voltage output current on the line 12 has exceeded a predetermined value. The current limiter circuit 154 protects the high-voltage supply 10 in case one of the thyratrons 16 through 20 misfires without having received a pulse from its associated pulser circuit 72 through 76. If an over-current condition is sensed, the current limiter 154 will impose a negative going signal on the line 71 thereby shutting down the high-voltage supply 10 just as if the crowbar sensor circuit 150 had detected a legitimate crowbar signal from one or more of the logic circuits 62 through 66.

The crowbar sensor circuit 140 includes a pair of transistors Q15 and Q16, a zener-diode D39, a diode D40, a transient suppression diode D42, resistors R60-R66, a capacitor C38, and a relay coil K2 which is operative to close a normally open relay contact pair K2-A which shuts down the series regulator 132 when closed. Additionally, the relay coil K2, when energized, opens a normally closed relay contact pair K2-B which in turn energize the "ACTIVE" neon indicator N.

In the crowbar sensor circuit 140 a collector terminal of the transistor Q15 is connected to the unregulated −48 volts DC line 131b. A base of the transistor Q15 is connected to the downgoing input signal line 71, an anode of the zener-diode D34, and a first terminal of the resistor R60. A cathode of the zener-diode D34 and a second terminal of the resistor R60 are both connected to electrical ground. An emitter of the transistor Q15 is connected to a first terminal of the resistor R61 and a first terminal of the resistor R62. A second terminal of the resistor R61 is connected to electrical ground. A second terminal of the resistor R62 is connected to a cathode of the diode D40. An anode of the diode D40 is connected to a first terminal of the resistor R63 and to a base input terminal of the transistor Q16. An emitter of the transistor Q16 is connected to electrical ground. A collector of the transistor Q16 is connected to a first terminal of the capacitor C38 and a first terminal of the resistor R64. A second terminal of the resistor R63 is connected to a second terminal of the capacitor C38. A second terminal of the resistor R64 is connected to a first terminal of the coil K2 and to a cathode of the transient suppression diode D42. An anode of the diode D42 and a second terminal of the coil K2 are connected to the unregulated −48 volt DC line 131b. The "ACTIVE" neon indicator N8 is connected between the two 48 volt DC supplies with the series current limiting resistors R65, R66.

The transistor Q15 is normally biased off by the resistor R60. A negative going signal on the line 71 from either the overcurrent detector 154 or one of the logic units 62 through 66 drives the base of the transistor Q15 negative turning on the transistor Q15. The emitter of the transistor Q15 will follow the base. When the transistor Q15 starts to conduct, current from the −48 volt DC unregulated supply flows through the collector-emitter junction of the transistor Q15, through the current limiting resistor R62, through the diode D40 and into the base of the transistor Q16 turning it on. The diode D40 is used to insure that the transistor Q16 will be turned off when the transistor Q15 is turned off. The zener-diode D39 is to protect the base of the transistor Q15 and to limit the magnitude of the negative going voltage that may be applied thereto. The resistor R61 in combination with the resistor R62 limit the base drive applyable to the transistor Q16. When the transistor Q16 conducts, current flows through the resistor R64 and through the relay coil K2. A current flowing in the coil K2 causes the relay contact pin K2-A to close and the relay contact pin K2-B to open. When the contacts K2-A close, the cathode of the diode D3 is grounded thereby shutting down the DC regulator 132. The duration of the negative going signal on the line 71 when generated by one of the logic units 62–66, is determined by the time interval of the pulse generated by the LM 555 counter in that logic unit. Thus, after the 0.01 second delay of the 555 timer, the signal on the line 71 will again return to ground turning off the transistor Q15, the transistor Q16 and deenergizing the relay coil K2. At this time the contacts K2-A will reopen permitting the series regulator 132 to commence operating again. Additionally, the relay contacts K2-B will reclose turning off the "ACTIVE" indicator N8. A similar sequence of operations occurs when the overcurrent detector circuit 154 applies a negative going signal to the line 71.

The excess crowbar circuit 136 senses the number of times the crowbar sensor circuit 140 has been triggered and if that number of times is excessive, the excess crowbar circuit 136 lights a visual "EXCESS" neon indicator N3 and also triggers the time delay 138 which shuts down the DC regulator 132 for a predetermined period of time.

The excess crowbar circuit 136 includes a silicon control rectifier (SCR) (SC1), neon indicators N2, N3, a plurality of resistors R67-R69, a plurality of capacitors C39-C42, a diode D41 and a potentiometer P4.

With respect to FIG. 3A, a first input to the neon indicator N3 is connected to the +48 volt unregulated DC supply on the line 131a. A second input to the indicator N3 is connected to a first terminal of the resistor R68. A second terminal of the resistor R68 is connected to a first terminal of the resistor R69, to an anode of the SCR SC1 and to a first terminal of the capacitor C42. A second terminal of the resistor R69 is connected to the first terminal of the capacitor C4 in the series regulator 132. A cathode of the SCR SC1 is connected to the −48 volt unregulated DC supply on the line 131b. A first terminal of the capacitor C41 is connected to the first terminal of the resistor R65. A second terminal of the capacitor C41 is connected to an anode of the diode D41. A cathode of the diode D41 is connected to a first fixed terminal of the potentiometer P4. A second fixed terminal of the potentiometer P4 is connected to a first terminal of the capacitor C40 to the variable terminal of the potentiometer P4 onto a first terminal of the neon tube N2. A second terminal of the capacitor C40 is connected to electrical ground. A second terminal of the neon tube N2 is connected to a gate input of the SCR SC1, a first terminal of the resistor R67 and a first terminal of the capacitor C39. A second terminal of the resistor R67 and a second terminal of capacitor C39 are each connected to the −48 volt unregulated DC supply on the line 131b. A shield around the tube N2 is also connected to the −48 volt unregulated DC line 131b.

The excess crowbar circuit 136 senses that a crowbar operation has taken place when the relay coil K2 in the crowbar sensing circuit has been energized and the normally closed contact pair K2-B has been opened. When the contact pair K2-B opens, the node connecting the capacitor C41 to the resistor R65 drops to a negative voltage. Each time the crowbar sensor circuit 140 is deenergized, and the relay contacts K2-B close again, the node between the capacitor C41 and the resistor R65 returns to electrical ground. Thus, at the anode of the diode D41 each time the contact pair K2-B recloses, a positive going pulse is coupled through the diode D41, through a potentiometer P4 and onto the capacitor C40. Thus, a voltage is established on the capacitor C40 with the indicated polarity. The setting of the potentiometer P4 determines how much charge is placed on the capacitor C40 with each pulse. When sufficient pulses have been received, in a short enough period of time, the voltage across the capacitor C40 is great enough to cause the neon tube N2 to conduct. When the tube N2 conducts, a positive going pulse is applied to the gate of the SCR SC1 causing it to conduct.

When the SCR SC1 conducts, it performs several functions. When the SCR SC1 conducts, its anode drops to a voltage near the −48 volts unregulated DC on the line 131b. As a result, a voltage on the order of 96 volts is established between the two terminals of the "EXCESS" neon indicator N3 causing it to immediately fire generating a visual indicator of the excess crowbaring condition. Additionally, the negative going voltage on the anode of the SCR SC1 is coupled to the first terminal of the resistor R69 which in turn drives the cathode of the diode D3 negative shutting down the series regulator 132. Finally, when the SCR SC1 conducts, it turns off an SCR SC2 in the time delay circuit 138. This commutation operation takes place by a pulse being transmitted through the coupling capacitor C42 from the excess crowbar circuit 136 to the time delay circuit 138.

Description of Time Delay Circuit 138 of FIG. 3a

FIG. 3a includes a schematic of the Time Delay Circuit 138. The time delay circuit 138 shuts down the series DC regulator 132 for about five seconds when the SCR SC1 triggers indicating an excess number of crowbar operations. The time delay circuit 138 includes a diode D43, the SCR SC2, a unijunction transistor Q17, a capacitor C43 and a plurality of resistors R70–R73.

In the time delay circuit 138, an anode of the diode D43 is connected to an anode of the SCR SC2, a first base of the unijunction transistor Q17, a first terminal of the resistor R73 and a first terminal of the resistor R72. A cathode of the diode D43 is connected to the first terminal of the coil K2 and to the cathode of the diode D42. A cathode of the SCR SC2 is connected to the unregulated −48 volt DC supply on the line 131b. A second base of the unijunction transistor Q17 is connected to a gate input of the SCR SC2 and a first terminal of the resistor R70. A second terminal of the resistor R70 is connected to the unregulated −48 volt DC supply on the line 131b. An emitter of the unijunction transistor Q17 is connected to a first terminal of the resistor R71. A second terminal of the resistor R71 is connected to a second terminal of the resistor R72 and a first terminal of a capacitor C43. A second terminal of the capacitor C43 is connected to the unregulated −48 volt DC supply on the line 131b. A second terminal of the resistor R73 is connected to electrical ground.

Under normal operating conditions the SCR SC2 is normally conducting and the SCR SC1 is normally turned off. If the excess crowbar condition is detected and the LM 555 counter on one or more of the logic circuits 62 through 66 generates the 0.01 second pulse, the SCR SC1 is turned on at the end of that pulse. When the SCR SC1 is turned on, a downgoing signal is coupled through the capacitor C42 which reduces the current through the SCR SC2 below the holding point turning it off. The signal which caused the SCR SC1 to conduct also represents the end of the pulse which provides drive to the coil K2. So long as the coil K2 is energized the normally open contacts K2-A will be closed inhibiting the operation of the series DC regulator 132. As soon as the SCR SC2 has been turned off, the coil K2 is again energized. This time the current flows from the unregulated −48 volt DC line 134b, through the coil K2, through the diode D43 and through the resistor R73 to ground. Additionally, with the SCR SC2 turned off, current flows through the line 131b through the capacitor C43, through the resistor R72, and through the resistor R73 to ground. Thus, a voltage develops across the capacitor C43 with a polarity as indicated in FIG. 3a. When the voltage across C43 becomes large enough, a process which takes about 5 seconds, the unijunction transistor Q15 conducts placing a voltage across the resistor R70 which retriggers the SCR SC2 into conduction. During the 5 second interval during which the SCR SC2 has been turned off, the relay coil K2 has been energized thereby inhibiting the operation of the DC regulator 132 hence shutting down the output high-voltage on the line 12. When the SCR SC2 starts to conduct, a downgoing pulse is coupled through the capacitor C42 which reduces the current through the SCR SC1 below the holding level causing the SCR SC1 to turn off. With SC1 turned off and SC2 conducting, current no longer passes through the coil K2. As a result, the contacts K2-A again open permitting the series DC regulator 132 to produce an output high-voltage on the line 12. Additionally, the downgoing pulse generated at the anode of the SCR SC2 is coupled through a coupling capacitor C44 and a diode D44 to turn off an SCR SC3 which is part of the setback circuit 150.

Description of the Over-Current Protection Circuit 152

To protect the power supply 10 in the instance where one of the thyratrons 16 through 20 has fired spontaneously without having been tripped by one of the pulser circuits 72 through 76, the current limiter circuit 154 is provided.

The current limiter circuit 154 includes a plurality of resistors R74–R79, an operational amplifier OP3, zener-diodes D46, D48, and a diode D45. A first terminal of the resistor R74 is connected to a first terminal of the resistor R8. A second terminal of the resistor R74 is connected to an input, pin 3, of the operational amplifier OP3. A second input, pin 2, of the operational amplifier OP3 is connected to a first terminal of the capacitor C45, a first terminal of the resistor R76 and a first terminal of a resistor R77. A second terminal of the resistor R76 is connected to electrical ground. A second terminal of the resistor R77 is connected to an anode of the diode D47 and to a first terminal of the resistor R78. A cathode of the diode D47 is connected to an anode of the diode D46. A cathode of the diode D46 is connected to electrical ground. A second terminal of the resistor R78 is connected to the −48 volt DC supply. A second terminal of the capacitor C45 is connected to an output, pin 6, of the amplifier OP3, and to a cathode of the diode D45, an anode of the diode D45 is connected to a first terminal of the resistor R79. A second terminal of the resistor R79 is connected to the line 71.

The resistor R75 and the zener-diode D48 establish a regulated positive voltage at the input pin 7 of the operational amplifier OP3. Similarly, the zeners D46, D47 in combination with a resistor R78, establish a negative reference voltage at the input pin 4 of the operational amplifier OP3. The resistors R76, R77 establish a voltage divider and provide a reference voltage at the pin 2 of the operational amplifier OP3 against which the voltage being sensed at the pin 3 of the operational amplifier OP3 is compared. When the voltage drop in the resistor R8 exceeds the voltage drop established at the input to pin 2 of the operational amplifier OP3, an output terminal, pin 6, will go negative forward biasing the diode D45 and generating what appears to the power supply circuitry on FIGS. 3a and 3b to be a feedback pulse which will shut down the high voltage power supply 10 as discussed previously. The resistor R79 limits the amount of current which flows into the amplifier OP3 during its negative transition period.

Description of the Setback Circuit 150

The setback circuit 150 is a multi-function circuit whose operation may be enabled or disabled by means of an automatic or a manual relay K-6. If the relay coil K-6 is energized, the automatic setback circuit 150 is disabled and an operator must adjust the high-voltage output on the line 12 to a desired value using a potentiometer and a meter which is calibrated in volts. If the automatic setback circuit 150 is enabled, by deenergizing the relay coil K-6, it will automatically increase the high-voltage output on the line 12 at a fairly high rate until a fault has been detected. Upon detection of a fault, and the subsequent ignition of one or more of the thyratrons 16 through 20, the fairly high rate of increase to the high-voltage on the line 12 will be disabled. Additionally, the voltage on the line 12 will be set back a predetermined amount. Finally, the setback circuit 150 will then attempt to increase the voltage on the line 12 at a slower rate. Each additional fault will cause a further setback and a subsequent attempted slowly increase to the voltage on the line 12.

Each time an excess number of crowbar operations has been detected by the excess crowbar circuit 136, after the time delay circuit 138 has timed out for its five second interval, the setback circuit 150 again increases the output voltage on the line 12 at its initial fairly high rate.

The setback circuit 150 includes, with respect to FIGS. 3a and b, the transistors Q18, Q19, the silicon control rectifier SC3, the field effect transistor Q20, a plurality of diodes D44,D49–D55, capacitors C46, C47, a plurality of resistors R80–R94, a potentiometer P5 and a potentiometer P6. The set-back circuitry also includes relay contact pairs K6-A, K6-B and K6-C. These contacts are normally opened or closed as indicated in FIG. 3b. As noted prevously, in the automatic mode the relay coil K-6 is not energized.

In the automatic setback circuit 150 a first terminal of the resistor R80 is connected to the unregulated 48 volt DC supply in the line 131a. A second terminal of the resistor R80 is connected to an anode of the diode D49 and an anode of the diode D50. A cathode of the diode D50 is connected to a first terminal of the resistor R82, a first terminal of the capacitor C46, a first terminal of the resistor R81, and anode of the diode D54, a cathode of the diode D55 and a first side of the normally opened relay contact K6-C. A second terminal of the resistor R81 is connected to an adjustable input terminal of the potentiometer P6. A first fixed input terminal of the potentiometer P6 is connected to the unregulated 48 volt DC supply line 131a. A second fixed terminal of the potentiometer P6 is connected to electrical ground. A second terminal of the capacitor C46 is connected to electrical ground. A second terminal of the resistor R82 is connected to an emitter input of the field effect transistor Q20. A first base terminal of the field effect transistor Q20 is connected to a fixed input terminal of the potentiometer P5. An adjustable input terminal of the potentiometer P5 is connected to a second input terminal of the potentiometer P5, and to a first side of the normally closed relay contact K6-A. A second side of the normally closed relay contact K6-A is connected via the line 152 to the feedback element 170a as shown in FIG. 7. A second base of the field effect transistor Q20 is connected to an anode of the diode D51. A cathode of the diode D51 is connected to electrical ground. A first terminal of the resistor R83 is connected to electrical ground. A second terminal of the resistor R83 is connected to a first terminal of the resistor R84 and receives a downward going input pulse from the anode of the diode D41 in the excess crowbar circuit 136. A second terminal of the resistor R84 is connected to a cathode of the diode D52. An anode of the diode D52 is connected to a first terminal of the capacitor C47 and to a base input of the transistor Q18. A second input to the capacitor C47 is connected to electrical ground. An emitter input of the transistor Q18 is connected to electrical ground. A collector input of the transistor Q18 is connected to an anode of the diode D53, a first terminal of the resistor R91 and a first terminal of the resistor R92. A cathode of the diode D53 is connected to a first terminal of the resistor R85. A second terminal of the resistor R85 is connected to a base input of the transistor Q19. An emitter of the transistor Q19 is connected to the negative 48 volt unregulated supply on the line 131b. A collector of the transistor Q18 is connected to a first terminal of the resistor R86 and a first terminal of the resistor R87. A second terminal of the resistor R86 is connected to electrical ground. A second terminal of the resistor R87 is connected to a cathode of the diode D54. An anode of the diode D54 is connected to one side of the normally open relay contacts K6-C, to a cathode of the diode D55 and to the first terminal of the resistor R81. A second side of the relay contact K6-C is connected to a second terminal of the resistor R89 and to a first terminal of the resistor R88. A second terminal of the resistor R89 is connected to the negative 48 volt unregulated DC supply on the line 131b. A second terminal of the resistor R92 is connected to a first terminal of the capacitor C44 and receives a commutation signal from the anode of the SCR SC2 in the time delay circuit 138. A second terminal of the capacitor C44 is connected to a cathode of the diode D44 and to a first terminal of the resistor R94. A second terminal of the resistor R94 is connected to electrical ground. A second terminal of the resistor R91 is connected to a gate input of the SCR SC3 and to a first terminal of the resistor R93. A second terminal of the resistor R93 is connected to electrical ground. An anode of the diode D44 is connected to an anode of the SCR SC3, a cathode of the diode D49, a first terminal of the resistor R90 and to a first side of the normally open relay contact pair K6-B. A cathode of the SCR SC3 is connected to the −48 volt unregulated DC supply on the line 131b. A second side of the normally open relay contact pair K6-B is connected to the −48 volt unregulated DC line 131b. A second terminal of the resistor R90 is connected to electrical ground.

When in the manual mode with rhe relay coil K6 energized, the normally open relay contact pairs K6-B and K6-C are closed. Additionally, the normally closed relay contact pair K6-A is opened. In this condition the diode D50 is reverse biased and the capacitor C46 has approximately a volt potential with respect to ground across it. The capacitor C46 in this case is charged by the parallel combination of resistors R88,R89. In this condition the field effect transistor Q20 has no effect on the feedback circuitry 110 due to the open relay contact pair K6-A.

In the automatic mode with relay coil K6 not energized, the relay contact pairs K6-A, B and C assume their normal positions as shown in FIG. 3b. In this mode the field effect transistor Q20 acts as a variable resistor which effects the feedback element 110a in FIG. 7 and as a result varies the high-voltage output applied the line 12 and ultimately to the output line 36. Upon first entering the automatic mode, the SCR SC3 is turned off and the capacitor C46 receives charge through the resistor R80 which in turn is connected to the unregulated positive 48 volt line 131a. Additionally, the capacitor C46 is charged through the resistor R81 which is also connected to the 48 volt positive unregulated DC supply through the potentiometer P6. As the voltage at the cathode of the diode D50 decreases from about −2 volts toward electrical ground, the field effect transistor Q20 tends to turn on more. This bleeds current away from the feedback element 110b in FIG. 7 resulting in an increase in the output voltage on the line 12. The voltage across the capacitor C46 will always remain negative with respect to ground.

As the noted voltage on the line 12 and ultimately the line 36 increases, at some point a fault will be detected causing a crowbar operation and which will trigger one or more of the thyratrons 16 through 20. At the start of the 0.01 second pulse which is generated by the LM 555 timer of FIG. 4A, a negative going pulse will be applied to the anode of the diode D41 in the excess crowbar circuit 136. This negative going pulse will be coupled through the resistor R84 and the diode D52 to turn on the transistor Q18. When the transistor Q18 turns on temporarily, a positive voltage, with respect to the cathode of SC3, is applied to the gate of the SCR SC3 turning SC3 on. With SC3 conducting, the diode D49 is forward biased which in turn reverse biases the diode D50. With the diode D50 reverse biased, the high speed increase in the output voltage on the line 12 will be terminated. Simultaneously, the diode D53 will be forward biased turning on the transistor Q19 for a brief period of time. With Q19 turned on, the diode D54 conducts which in turn tends to reduce away from ground the voltage on the cathode of the diode D50. This then produces a setback in the high-voltage output on the line 36 as the field effect transistor Q20 tends to conduct less resulting in a reduced high-voltage output on the line 12. After a brief interval of time the transistors Q18 and Q19 turn off although the SCR SC3 continues to conduct. In this condition the capacitor C46 tends to charge toward ground very slowly through the resistor R81 and the potentiometer P6. This thus results in a slow increase of the high-voltage output on the line 12.

Each time crowbar indicating pulse is sensed, by the crowbar sensor circuit 140 on FIG. 3, the transistors Q18 and Q19 will turn on briefly thus reducing the voltage on the cathode of the diode D50 and reducing the high-voltage on the line 12. If an excess number of crowbars is detected, as discussed previously, the series DC regulator 132 is shut down for about five seconds. At the end of the five seconds, when the SCR SC2 comes on, it couples a downgoing pulse through the capacitor C44 and the diode D44 to shut down the SCR SC3 in the setback circuit 150. With the SCR SC3 shut down, the output high-voltage on the line 12 starts to increase rapidly until the next fault is detected.

Description of the Dv/Dt Sensors 92–96 of FIG. 6.

As noted with respect to FIG. 1, located remotely from the high-voltage source 10 out at the site of the press, are a set of three Dv/Dt sensor units 92 through 96. Each of the units 92 through 96 is identical and its purpose is to sense a predetermined rate of change of output voltage with respect to time. Each of the Dv/Dt sensors 92 through 96 is capacitively coupled as shown in FIG. 1 with a capacitive coupling 92a, 94a, 96a to the output high-voltage line 36. Each of the Dv/Dt sensors 92 through 96 which is coupled by one of the cables 102 through 106 to one of the pulser circuits 72 through 76. Each of the Dv/Dt sensor units 92–96 can generate a negative going pulse on the associated line 102–106, on the order of at least 11 volts, going to ground when an excessive rate of change of voltage on the line 36 is sensed. Each of the pulser circuits 72 through 76, as discussed previously, can sense this negative going pulse and can trigger one or more of the thyratrons 16 through 20. Additionally, located remote with the Dv/Dt sensors 92 through 96 and connected across a selected one of the cables 102 through 106 is a remote portion 110b of the high-voltage feedback element 110. The element 110b includes a comparator with associated electric elements which generates a scaled feedback signal. That feedback signal is communicated from the remote press location along the selected cable as essentially a DC signal to the remainder of the feedback element 110a located adjacent the high-voltage source 10 and which is shown in FIG. 7.

FIG. 6 is a schematic of the Dv/Dt sensor unit 96, a schematic of the remote portion 110b of the high-voltage feedback element 110, a schematic of the isolation resistor 34, and the voltage limiting zener circuitry 40. The other two Dv/Dt sensor units 92, 94 are identical to the unit 96 except as discussed subsequently.

In FIG. 6, first and second capacitive couplings 205, 210, corresponding to the capacitive coupling 96a, as shown wrapped around the output line 36. The Dv/Dt sensor unit 96 includes a plurality of resistors R95–R105, a plurality of capacitors C48–C53, a plurality of diodes D56–D63, and a plurality of transistors Q21–Q24.

A first terminal of the resistor R95 is connected by a wire 210' and capacitive coupling 210 to the high-voltage output line 36. A second terminal of the resistor R95 is connected to a first terminal of the resistor R96 and to a first terminal of the capacitor C48. A second terminal of the resistor R96 is connected to electrical ground. A second terminal of the capacitor C48 is connected to a cathode of the diode D56 and to an anode of the diode D57 as well as to a first terminal of the resistor R97. An anode of the diode D56 is connected to electrical ground. A cathode of the diode D57 is connected to a second terminal of the resistor R97, a first terminal of the capacitor C49. A second terminal of capacitor C49 is connected to a first terminal of the resistor R98, a cathode of the diode D58 and a base of the transistor Q21. A second terminal of the resistor R98 and an anode of the diode D58 are connected to electrical ground. An emitter of the transistor Q21 is connected to a first terminal of the resistor R99 and to base of the resistor Q22. A second terminal of the transistor R99 and an emitter of the transistor Q22 are connected to electrical ground. A collector of the transistor Q21 is connected to a first terminal of a resistor R105, a first terminal of resistor R104, a first terminal of the resistor R103, a first terminal of the resistor R104 as well as a cathode of the diode D60 and a cathode of the diode D63. A second terminal of the resistor R105 is connected to an anode of the diode D59. A cathode of the diode D59 is connected to a first terminal of the capacitor C50 and a first terminal of the capacitor C51. A second terminal of the capacitor C50 and a second terminal of the capacitor C51 are both connected to electrical ground. An anode of the diode D60 is connected to a cathode of the diode D61, a cathode of the diode D62, a first terminal of the capacitor C52 and a first terminal of the resistor R100. An anode of the diode D61 is connected to electrical ground. A second terminal of the resistor R700 is connected to an anode of the diode D62, and a first terminal of the capacitor C53. A second terminal of the capacitor C53 is connected to an anode of the diode D63, a second terminal of the resistor R103 and a base of the transistor Q23. A collector of the transistor Q23 is connected to electrical ground. An emitter of the transistor Q23 is connected to a second terminal of the resistor R104 and a base of the transistor Q24. A collector of the transistor Q24 is connected to electrical ground. A second terminal of the capacitor C52 is connected to a second terminal of the resistor R701 and to a first terminal of the resistor R102. A second terminal of the resistor R102 is connected to a line 205' and the capacitive coupling 205 wrapped around the output high-voltage line 36.

Positive going pulses on the line 36 are sensed on the input line 210'. Negative going pulses on the line 36 are sensed on the input line 205'. The signal output line 106 is shown in FIG. 6 as the center of a grounded coaxial cable having a grounded shield 106a. When the Dv/Dt sensor circuit 96 of FIG. 6 has not sensed an excessively high rate of change at the high-voltage output line 36, the voltage on the line 106 with respect to the ground connection 106a is on the order of 12 volts for the Dv/Dt sensor 96. The Dv/Dt sensor 96 is connected to the remote portion 110b of the feedback element 110. For the othet two Dv/Dt sensors 92, 94 which are not connected to the remote portion 110b of the feedback element 110, the output voltage on the lines 102 or 104 is on the order of positive 30 volts DC. The Dv/Dt sensor units 92, 94 are identical to the sensor unit 96 except that they do not include the resistor R105, and the diode D59. The resistor R105 and diode D59 are replaced by short circuits in the Dv/Dt volt sensors 92, 94. Additionally, the sensors 92, 94 do not include the connection represented by a wire 215 between the feedback element 110b and the Dv/Dt sensor 96.

When a positive going pulse appears on the high-voltage line 36 it is coupled through the end 210 of the line 210'. Current passes through the resistor R95 through the capacitor C48, the diode D57, the capacitor C49 and turns on the transistor Q21. With the transistor Q21 on, the transistor Q22 is also turned on. When the transistor Q22 is turned on its collector goes to ground which in turn turns on the transistor Q24 which is connected to the line 106. When the transistor Q24 is on, the line 106 goes to ground. The ground signal is sensed by the pulser 76. In a similar fashion, when a negative going pulse sensed at the capacitive coupling 205 at the end of the line 205' is transmitted through the line 205', 205 coupled through the capacitor C52, the diode D62, the capacitor C53 and turns on the transistor Q23. With the transistor Q23 conducting, its emitter goes to ground which turns on the transistor Q24 applying a downgoing pulse to ground on the line 106.

Description of the Remote Part 110b of the Feedback Element 110.

The remote portion 110b of the feedback element 110 senses the high-voltage appearing on the output line 36 and generates an electrical signal having a constant part plus part equal to 1/500 of the high-voltage output on the line 36. The remote feedback element 110b includes resistor elements R106–R121, diodes D64–69, capacitor C54 and the operational amplifier OP4. The high-voltage is actually sensed utilizing a diode bridge having diodes D70–D73. The feedback signal is coupled through the line 112a, b and through two sets of resistors forming two voltage dividers. The resistors R107–R113 form one divider. The resistors R114–R117 form the second divider. The reduced feedback voltage is then applied as a pair of inputs on the pins 2, 3 to the operational amplifier OP4. The diode D68 and the resistor R120 provide an offset to the operational amplifier OP4 which keeps it in its linear operating range. The output on pin 6 of the operational amplifier OP4 as coupled through the diodes D68, D69 to the communication line 106. The diodes D68–D69 provide an additional 10 volts offset to insure that the Dv/Dt sensor 96 will have adequate power to operate.

FIG. 6 also shows the details of the polarity reversing switch 32 which makes it possible to apply a positive or negative high-voltage to the press rollers. Two sets of zener-diodes 40 are shown to provide redundancy and limit the output voltage on the line 36. Each of the diodes 40 is a type 1N5117 zener diode. The isolation resistor 34 is shown between the polarity reversing switch 32 and the zener-diodes 40. The isolation resistor 34 is comprised of ten resistors in series, each one of which has a value of 47 kohms.

A relay coil K4 may be energized to apply the high-voltage on the line 36 to the load. A test load RT of eight resistors in series, each having a value of 56 kohms receives the high-voltage if the coil K4 is not energized. If the coil K4 is energized, normally closed contacts K4-A are opened and normally opened contacts K4-B are closed applying high-voltage to the line 36 and the load.

Description of the Local Part 110a of The Feedback Element 110.

FIG. 7 is a schematic of the local part 110a of the feedback element 110. The feedback element of FIG. 7 includes four operational amplifiers OP5–OP8, zener-diodes D74, 75, diodes D76–80, resistors R122–R138, capacitors C55–C57 and potentiometers P7, P8.

The feedback element 110a of FIG. 7 is connected to the line 106. A first terminal of the resistor R122 is connected to line 106. A second terminal of the resistor R122 is connected to an anode of the diode D79, a cathode of the diode D80 and a first terminal of the resistor R123. A cathode of the diode D79 is connected to a positive 30 volts regulated DC supply. An anode of the diode D80 is connected to electrical ground. A second terminal of the resistor R123 is connected to pin 3 of the operational amplifier OP5. A second input pin 2, of the operational amplifier OP5 is connected to a first terminal of the resistor R125. A second terminal of the resistor R125 is connected to a first terminal of the resistor R124 and to a cathode of the zener-diode D74. A second terminal of the resistor R124 is connected to a positive 48 volt unregulated DC supply. An anode of the diode D74 is connected to a cathode of the diode D75 and a first terminal of the resistor R126. An output of the operational amplifier OP5, pin 1, is connected to an anode of the diode D75 and a first terminal of the resistor R128. A second terminal of the resistor R128 is connected to a first input, pin 12, of the operational amplifier OP6. A second input, pin 13, to the operational amplifier OP6 is connected to a variable input terminal of the potentiometer P7. A first fixed input terminal of the potentiometer P7 is connected to a second terminal of the resistor R126. A second fixed terminal of the potentiometer P7 is connected to a first terminal of the resistor R127. A second terminal of the resistor R127 is connected to an output point, pin 14, of the operational amplifier OP6 and to a first terminal of the resistor R129. A second terminal of the resistor R129 is connected to a first input, pin 5, of the operational amplifier OP7. A second input, pin 6, of the operational amplifier OP7 is connected to a first terminal of the resistor R130 and to a first terminal of the capacitor C56. An output terminal of the operational amplifier OP7, pin 7, is connected to a second terminal of the resistor R130, a second terminal of the capacitor C56, an anode of the diode D77 and a first terminal of the resistor R131. A cathode of the diode D77 is connected to a first input terminal of the resistor R139. A second terminal of the resistor R139 is connected to a first terminal of a 0 to 1 milli ammeter 220 calibrated in volts. A second terminal of the ammeter 220 is connected to electrical ground. A second terminal of the resistor R131 is connected to a first terminal of the resistor R132, a first terminal of the resistor R133 and a first terminal of the resistor R134 at the line 152. A second terminal of the resistor R132 is connected to the regulated positive 15 volt DC supply. A second terminal of the resistor R134 is connected to electrical ground. A second terminal of the resistor R133 is connected to a first input, pin 10, of the operational amplifier OP8. A second input, pin 9, to the operational amplifier OP8 is connected to a first terminal of the resistor R136, a first capacitor C57, and a first terminal of the resistor R135. A second terminal of the resistor R135 is connected to a wiper arm of the potentiometer P8. A first fixed terminal of the potentiometer P8 is connected to electrical ground. A second fixed terminal of the potentiometer P8 is connected to a first end of the resistor R138. A second end of the resistor R138 is connected to the regulated 15 DC supply. An output point, pin 8, of the operational amplifier OP8 is connected to a second terminal of the resistor R136, a second terminal of the capacitor C57 and a first terminal of the resistor R137. A second terminal of the resistor R137 is connected to an anode of the diode D78. A cathode of the diode D78 is connected to the output line 114.

The operational amplifiers OP5, OP6 of FIG. 7 remove a 10 volt offset from the feedback signal and also compensate for any variations in the zener-diodes D74, D75. The operational amplifier OP7 provides a point where the output high-voltage may be monitored via the meter 220 and also provides a connection to the line 152 into the setback circuit 150 of FIG. 3b. The operational amplifier OP8 connected to the potentiometer P8 provides an input where the output high-voltage may be adjusted manually. A buffered output to the line 114 is also provided by the operational amplifier OP8. The operational amplifier OP8 generates an error signal which on the line 114 is used to adjust the output voltage on the line 36.

FIG. 8 is a detailed schematic showing the sensing resistors 25, the diodes 24 connected in parallel with each of the sensing resistors 25, and the shorting connection 26 between each of the diodes 24 and the resistors 25. FIG. 8 shows the zener-diode 22 of FIG. 1 as being composed of three series connected zeners D81–D83. The purpose of the series connected diodes D81–D83 is to insure that the voltage on the line 12 will be always large enough so that the thyratrons 16–20 will have at least a voltage on the order of 600 volts across them. This insures fast turn-on of each of the thyratrons 16–22 when pulsed by one of the pulser units 72–73. Each of the sensor resistors 25 is a 100 kohm, 1 watt resistor. Each of the sensor diodes 24 is a 1N2071 type diode. FIG. 8 also shows the ammeter 28 connected between the node 27b and the output line 30. The ammeter 28 is connected with a plurality of protection diodes 28a and b, protective capacitor 28c and a current loading resistor 28d. Each of the diodes 28a and 28b is a 1N4004 type diode. The capacitor 28c is a 0.1 microferad capacitor. The resistor 28d is a 100 ohm resistor.

Theory of Operation of Impedance Sensing Circuits 42–46

Figure 9:
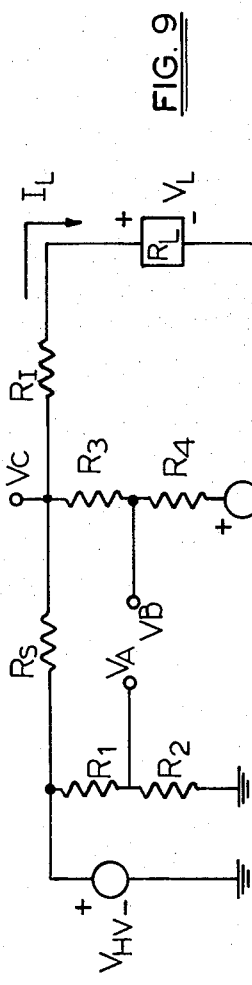
FIG. 9 is an explanatory schematic of the impedance sensor.

With respect to FIG. 9 where:
$R_S$ is a sensing resistor
$R_I$ is an isolation resistor
$R_L$ is an external load resistance
$R_1$–$R_4$ are divider resistors,
suppose that $R_3 >> R_S$, so that current flow through $R_3$ is negligible for this analysis. Also, assume $R_1 >> R_2$ and $R_3 >> R_4$. Then $$V_C = V_{HV} \frac{R_I + R_L}{R_S + R_I + R_L}$$

and, since $R_1 >> R_2$ and $R_3 >> R_4$, we may approximate $$V_A = V_{HV}(R_2/R_1)$$

$$V_B = V_C(R_4/R_3) + V_{OS}$$

Substituting for $V_C$, $$V_B = V_{HV} \frac{R_I + R_L}{R_S + R_I + R_L} \cdot \frac{R_4}{R_3} + V_{OS}$$

If we compare $V_A$ and $V_B$ using a voltage comparator, the output will change states when $V_A = V_B$, which occurs when $$V_{HV} \frac{R_2}{R_1} = V_{HV} \frac{R_I + R_L}{R_S + R_I + R_L} \cdot \frac{R_4}{R_3} + V_{OS}$$

Rearranging terms, the condition for $V_A = V_B$ is $$\frac{R_I + R_L}{R_S + R_I + R_L} = \frac{R_3 R_2}{R_1 R_4} - \frac{V_{OS} R_3}{V_{HV} R_4}$$

or, solving for $R_L + R_I$, $$R_I + R_L = \frac{\frac{R_3 R_2}{R_1 R_4} - \frac{V_{OS} R_3}{V_{HV} R_4}}{1 - \frac{R_3 R_2}{R_1 R_4} + \frac{V_{OS} R_3}{V_{HV} R_4}} \cdot R_S$$

Suppose $V_{OS} = 0$, and let $R_1 = R_3$ and $R_4 = 2R_2$. Then, substituting, $$R_I + R_L = \frac{\frac{1}{2}}{1 - \frac{1}{2}} R_S = R_S$$

That is, if the offset voltage $V_{OS}$ is zero and the resistors are chosen as above, then the impedance sensor output will change state when the sum of the load and isolation resistance is equal to the sensing resistance. This is the key to the impedance sensor operation. In the simplified case where $V_{OS} = 0$, the state of the Z-sensor outputs is independent of output voltage, and depends entirely on the value of $R_I + R_L$. When $V_{OS} \neq 0$, the sensitivity of the sensor depends on the voltage $V_{HV}$. When $R_1 = R_3$ and $R_4 = 2R_2$ we have $$\frac{R_I + R_L}{R_S} = \frac{V_{HV} - \frac{2V_{OS} R_3}{R_4}}{V_{HV} + \frac{2V_{OS} R_3}{R_4}}$$

as the expression for the threshold resistance.

This offset is used to restart the supply after a crowbar by forcing the impedance sensor unit out of the "fault" mode at low $V_{HV}$, where the risk of a discharge is minimal.

The sensitivity of the sensor rises as $V_{HV}$ increases. In practice, $R_2$ is adjustable so that the threshold value of $R_L$ may be set accurately. For the values shown here and $R_S = 1$ Meg, $R_I = 500K$, a short circuit could be detected at the load with only 82 uA flowing through the fault. Since this is far below the current needed to sustain a constricted-glow discharge according to our experiments, (usually requires 1 to 2 mA), there is little chance of a short circuit opening up to become a steady-state discharge. Because the impedance sensor is a rather slow device, it is important that the high-voltage be restored gradually after a fault, or inaccurate sensing will occur. A slow start is insured in the supply 10 in that the capacitor C4 must be charged through the resistor R4 after a fault, a drop in load impedance, has been detected before the regulator 132 can turn back on again.

The following exemplary circuit elements when used in the circuits of FIGS. 1–8 provide about 2.5 Milliamps of load current at a load voltage of about 2000 volts. The Dv/Dt volt sensors 92–96 will sense a 60 Kz, 50 volt peak-to-peak sine wave.

| RESISTORS | | | |
|---|---|---|---|
| R1 | 10Ω at 2W | R37 | 2.2K |
| R2 | 6.2K | R38 | 330 |
| R3 | 18K | R39 | 15K |
| R4 | 10K | R40 | 47K |
| R4' | 47Ω | R41 | 15K |
| R5, R6 | 6.2K | R42 | 100K |
| R7 | 10Ω, 50 W | R43 | 2.7 K at 1W. |
| R8 | 100Ω | | |
| R9 | 96K(8×12KΩ) | R44 | 100K |
| R10, R11 | 4.7K | R45 | 3.9K |
| R12, R13 | 56K | R46 | 2.2K |
| R14 | 25M, 25W | R47, 48 | 33K |
| R15 | 100K | R49 | 150Ω |
| R16 | 1.2K | R50 | 1K |
| R17 | 25M, 2.5W | R51 | 470Ω |
| R18 | 39K | R52 | 1K |
| R19 | 47K | R53 | 2.2K |
| R20 | 22K | R54 | 56Ω |
| R21 | 1.2K | R55 | 33K |
| R22 | 82K | R56 | 22K |
| R23 | 1MΩ | R57 | 1K |
| R24, R25 | 220K | R58, 59 | 2.7K |
| R26 | 330K | R60 | 10K |
| R27 | 3.9M | R61 | 15K |
| R28 | 4.7K | R62 | 470Ω |
| R29 | 22K | R63 | 10K |
| R30 | 1.0M | R64 | 1.8K at 1W. |
| R31, 32 | 100K | R65 | 4.7K at 1W. |
| R33, 34 | 1K | R66 | 15K |
| R35 | 22K | R67 | 220Ω |
| R36 | 10K | R68 | 22K |
| | | R69 | 10K |
| R70 | 47Ω | R103 | 3.3M |
| R71 | 22Ω | R104 | 330K |
| R72 | 220K | R105 | 1K |
| R73 | 1.8K | R106 | 100MΩ |
| R74, 75 | 10K | R107 | 100MΩ |
| R77 | 270K | R108, 109 | 4.7MΩ |
| R78 | 7.5K | R110–113 | 221KΩ |
| R79 | 22K | R114 | 100MΩ |
| R80 | 22MΩ | R115, 116 | 4.7MΩ |
| R81 | 300MΩ | R117, 118 | 221K |
| R82 | 1MΩ | R119 | 316K |
| R83 | 47K | R120 | 1.1MΩ |
| R84 | 10K | R121 | 220K |
| R85 | 47K | R122 | 100K |
| R86 | 10K | R123 | 120K |
| R87 | 10MΩ | R124 | 22K |
| R88 | 620Ω | R125 | 220K |
| R89 | 15K | R126 | 470K |
| R90 | 4.7K | R127 | 33K |
| R91 | 12K | R128 | 150K |
| R92 | 10K | R129 | 100K |
| R93 | 220Ω | R130 | 330K |
| R94 | 1MΩ | R131 | 12K |
| R95 | 220K | R132 | 7.5K |
| R96 | 2.9MΩ | R133 | 180K |
| R97 | 100K | R134 | 1.5K |
| R98 | 3.3MΩ | R135 | 1MΩ |
| R99 | 330K | R136 | 220K |
| R100 | 100K | R137, 138 | 150K |
| R101 | 3.9MΩ | R139 | 6.2K |
| R102 | 220K | | |

| POTENTIOMETERS | |
|---|---|
| P1 | 5KΩ |
| P2 | 20KΩ |
| P3 | 50KΩ |
| P4 | 1MΩ |

-continued

| | | | |
|---|---|---|---|
| P5 | 5K | | |
| P6 | 20K | | |
| P7,P8 | 100K | | |

| SILICON CONTROLLED RECTIFIERS | |
|---|---|
| SC1 | G.E. Type No. C6A |
| SC2 | G.E. Type No. C6F |
| SC3 | G.E. Type No. C6F |

| TRANSISTORS | |
|---|---|
| Q1–Q3 | 2N3440 |
| Q4 | 2N1893 |
| Q5, Q6 | 2N3583 |
| Q7, Q8 | 2N3440 |
| Q9 | 2N5322 |
| Q10 | 2N5322 |
| Q11 | 2N5322 |
| Q12 | 2N1893 |
| Q13, Q14 | 2N3392 |
| Q15 | 2N4249 |
| Q16 | 2N3645 |
| Q17 | 2N2646 |
| Q18 | 2N4249 |
| Q19 | 2N3859A |
| Q20 | 2N4221 |
| Q21,22 | MPS6530 |
| Q23,24 | 2N3645 |

DIODES

Bridge rectifiers D1 each diode Motorola type MDA970-2;
Bridge rectifier D2, each diode Motorola Type MDA422-2;

| | | | |
|---|---|---|---|
| D3 | 1N645 | | |
| D4–D6 | 1N751A | | |
| D7 | 1N4156 | | |
| D8,D9 | 1N645 | | |

Bridge rectifier D10, each diode Varo77156-6;

| | | | |
|---|---|---|---|
| D11 | 77156 | | |
| D12–D15 | 1N459 | | |
| | | D42 | 1N34A |
| D16 | 1N3595 | D43 | 1N645 |
| D17 | 1N3595 | D44 | 1N2071 |
| D18 | 1N3595 | D45 | 1N3595 |
| D19 | 1N3595 | D46,47 | 1N751A |
| D20 | 1N3595 | | |
| D21 | 1N3595 | | |
| | | D48 | 1N751A |
| D22 | 1N3595 | | |
| | | D49 | 1N459 |
| D23 | 1N3595 | | |
| | | D50 | 1N3595 |
| D24 | 1N3595 | | |
| | | D51 | 1N645 |
| D25 | 1N3595 | | |
| | | D52 | 1N459 |
| D26 | 1N3595 | | |
| | | D53 | 1N4156 |
| | | D54,55 | 1N3595 |
| D27,28 | 1N4753 | | |
| | | D56–D63 | 1N3595 |
| D29,30,31 | 1N2483 | D64–67 | 1N459 |
| D32,D33 | 1N3595 | D68,69 | 1N751A |
| D34,35,36,37,38 | 1N459 | D70–73 | 77156 |
| | | D74,75 | 1N751A |
| D39 | 1N751A | | |
| | | D76 | 1N459 |
| D40,41 | 1N459 | | |
| | | D77 | 1N4156 |
| | | D78 | 1N3595 |
| | | D79,80 | 1N459 |
| | | D81–83 | 1N3051 |

CAPACITORS

| | | | |
|---|---|---|---|
| C1, C2 | 1000 μf at 50 volts | C30 | .1 μf |
| C3 | .047 μf | C31 | 1.0 μf |
| C4 | 20 μf at 50 volts | C32 | .01 μf |
| C5, C6 | .047 μf | C33 | .001 μf |
| C7 | 50 μf at 50 volts | C34 | .0 μf |
| C8 | .001 μf | C35 | .01 μf |
| C9, C10 | .047 μf | C36 | .05 μf |
| C11 | 150 pf | C37 | .001 μf |
| C12 | 500 pf | C38 | 220 pf |
| C13 | .001 μf | C39 | .001 at 600 volts |
| C14 | 500 pf | C40 | .1 |
| C15 | 68 pf | C41 | .047 μf |
| C16 | 47 pf | C42 | .22 μf |
| C17, C18 | 150 pf | C43 | 10 μf at 50 volts |
| C19 | 100 pf | C44 | .22 μf |
| C20, 21 | .01 μf | C45 | 150 pf |
| C22, 23 | 330 pf | C46 | 5 μf |
| C24, 25 | 500 pf | C47 | 1 μf at 35 volts |
| C26 | 110 pf | C48,49 | .001 μf |
| C27 | 150 pf | C50 | 10 μf |
| C28 | .001 μf | C51 | .1 μf |
| C29 | .01 μf | C52,53,54 | .001 μf |

Although various modifications might be suggested by those skilled in the art, it should be understood that we wish to embody within the scope of the patent warranted hereon all such modifications as reasonably and properly come within the scope of our contribution to the art.

We claim as our invention:

1. An improved electroassist printing system to safely apply a high voltage, generated by a power supply with two high voltage terminals, to a load including selected cylinders of a printing press, the improvement comprising:

first means for sensing, to sense the impedance of the load essentially independent of load current;

said first means for sensing includes first and second voltage divider means and means for comparing, said first and second voltage divider means are respectively connected between first and second selected nodes and a reference node, said means for comparing is connected between third and fourth nodes selectively located respectively on said first and second voltage divider means;

first means for generating, connected to said first means for sensing, to generate a first signal, indicating that the load impedance has fallen below a selected value; and means for switching connected in parallel with the output terminals of the power supply, to sense said first signal and to switch from a non-conducting state to a conducting state to quickly provide a low impedance path between the terminals of the power supply thereby reducing the voltage applied to the load.

2. The apparatus according to claim 1, wherein said first means for sensing includes:

means for comparing two non-reference voltages to provide said first signal when the load impedance drops below said selected value.

3. The apparatus according to claim 1, for use where the power supply has additionally a control input to control the operation of a high-voltage generator within the supply, said apparatus including further:

second means for sensing, to sense said first signal and to apply a control signal to the control input to shut off the high voltage generator for a selected period of time.

4. The apparatus according to claim 3, including:

means for automatically varying the high voltage, to sense said first signal and to reduce by a selected amount the high voltage to be applied to the load at the end of said selected period of time.

5. The apparatus according to claim 4, including further:
means to increase the reduced high voltage at a selected rate.

6. An improved electrostatic printing system to safely apply a high voltage, generated by a power supply with two high voltage terminals, to a load including selected cylinders of a printing press, the improvement comprising:
first means for sensing, to sense the impedance of the load essentially independent of load current;
first means for generating, connected to said first means for sensing, to generate a first signal, indicating that the load impedance has fallen below a selected value;
means for switching connected in parallel with the output terminals of the power supply, to sense said first signal and to switch from a non-conducting state to a conducting state to quickly provide a low impedance path between the terminals of the power supply thereby reducing the voltage applied to the load;
second means for sensing capacitively coupleable to the load and adapted to sense a rate of change, with respect to time, of the voltage applied to the load;
second means for generating, connected to said second means for sensing, to generate a second signal, indicating that a selected rate of change of voltage with respect to time has been exceeded;
said means for switching adapted to sense said second signal and switch from said non-conducting state to said conducting state to quickly provide said low impedance path between the terminals of the power supply.

7. An improved electroassist printing system to safely apply a high voltage, generated by a power supply with two high voltage terminals, to a load including selected cylinders of a printing press, the improvement comprising:
first means for sensing, to sense the impedance of the load essentially independent of load current;
first means for generating, connected to said first means for sensing, to generate a first signal, indicating that the load impedance has fallen below a selected value; and
means for switching connected in parallel with the output terminals of the power supply, to sense said first signal and to switch from a non-conducting state to a conducting state to quickly provide a low impedance path between the terminals of the power supply thereby reducing the voltage applied to the load;
said first means for sensing includes means for comparing two non-reference voltages to provide said first signal when the load impedance drops below said selected value; and
said means for switching includes at least a first transistor, and associated means for biasing, to bias said transistor so that it operates in an avalanche mode, said transistor adapted to sense said first signal and to switch, in said avalanche mode, to generate a selected signal.

8. The apparatus according to claim 7, wherein said means for switching includes further:
a high voltage electronic switch with a pair of high voltage terminals connected to the terminals of the high voltage supply and an input control means adapted to sense said selected signal and to cause said high voltage electronic switch to switch from said non-conducting state to said conducting state.

9. A safety apparatus for use with a high-voltage power supply operative to supply an output high-voltage and an output current, through a pair of terminals, to a load comprising:
electronic means for sensing, connected between the output terminal of the high-voltage supply and one terminal of the load, to continually sense the load impedance essentially independently of the values of the output high voltage and the output current, and to generate a first electrical signal if the load impedance drops below a selected value;
said electronic means for sensing includes first and second voltage divider means connected to electrical signal generation means, said first voltage divider means is connected between the output terminal of the high-voltage supply and a reference node, said second voltage divider means is connected between the one terminal of the load and said reference node, said first and second voltage divider means are adapted to generate a selected differential voltage therebetween whose value indicates that the load impedance has dropped below the selected value, said electrical signal generation means is adapted to sense said selected differential voltage and to generate the first electrical signal in response thereto;
means for signal generating, to generate a control signal in response to said first electric signal; and
means for crowbaring, connected in parallel across the first output terminal of the power supply and a second, reference, output terminal of the power supply, to sense said control signal and to quickly provide a low impedance path between the two terminals of the power supply.

10. The safety apparatus according to claim 9, including further:
means for differentiating to sense a voltage variation, with respect to time, in the high-voltage supplied to the load and to generate a second electrical signal if said sensed voltage variation exceeds a preselected value; and
said means for signal generating adapted to generate said control signal in response to said second electrical signal.

11. The safety apparatus according to claim 9 for use with a high-voltage power supply that has a control signal input terminal to which a control signal can be applied to enable or disable generation of the high-voltage at the output terminals of the supply, said apparatus including:
means for control, connected to the control signal input terminal, to sense said first electrical signal and to disable generation of the high-voltage at the output terminals of the supply.

12. The apparatus according to claim 11, wherein:
said means for control disables generation of the high-voltage for a selected interval of time.

13. A method of safely operating a high-voltage power supply connected to a load comprising the steps of:
generating a high voltage to be supplied to the load;
applying the high voltage to the load and supplying a load current;
continuously sensing the impedance of the load essentially independently of the value of the high voltage or the load current by continuously dividing first and second selected voltages and sensing a differential voltage between selected parts of the divided voltages; and terminating the generation of high voltage when the sensed impedance falls below a selected value.

14. The method according to claim 13, including the added step of:

reinitiating the high voltage generation after a selected interval of time.

15. The method according to claim 14, including the further step of:

reducing the high voltage, to be applied to the load, a selected amount before reinitiating the high voltage generation.

16. The method according to claim 15, including the further step of:

increasing the voltage applied to the load, after the step of reinitiating the high voltage generation, at a selected rate.

17. A method of automatically compensating for impedance variations in a load to which a high voltage is being applied and to which a load current is being supplied comprising the steps of:

generating a high voltage to be applied to the load;
applying the high voltage to the load;
increasing the high voltage at a first selected rate;
continuously sensing the impedance of the load essentially independently of the value of applied high voltage or supplied output current by continuously dividing first and second selected voltages and sensing a differential voltage between selected parts of the divided voltages;
disabling generation of the high voltage, for a selected time interval, if the sensed load impedance falls below a selected value, and simultaneously connecting a low impedance path between the two output terminals of the high voltage supply to immediately reduce the high voltage applied to the load;
reducing the high voltage to be supplied to the load a selected amount;
disconnecting the low impedance path between the terminals of the power supply;
enabling generation of the reduced high voltage; and
increasing, at a second rate, the reduced high voltage applied to the load.

18. The method according to claim 17, including, after the step of increasing the value of the reduced high voltage applied to the load, the additional steps of:

continuously sensing the load impedance essentially independently of the values of applied high voltage or supplied output current; and
disabling generation of the high voltage applied to the load, which is increasing at the second rate, and simultaneously connecting a low impedance path between the terminals of the power supply if the sensed load impedance again falls below the selected value.

19. The method according to claim 18, including, after the step of disabling generation of the high voltage applied to the load, which is increasing at the second rate, the steps of:

reducing, again, the voltage to be applied to the load;
disconnecting, again, the low impedance path between the terminals of the power supply;
enabling, again, generation of the reduced high voltage; and
increasing, again, at the second rate, the reduced high voltage to be applied to the load.

20. The method according to claim 17, including the further steps of:

sensing a rate of change of the high voltage applied to the load as a function of time; and
disabling generation of the high voltage, for a selected time interval, if the sensed rate of change of load voltage exceeds a preselected value and simultaneously, connecting the low impedance path between the terminals of the power supply to quickly reduce the voltage applied to the load.

21. A safety apparatus for use with a printing press to quickly reduce an output high voltage applied across an impression roller and a print cylinder with a web or a sheet material passing between the roller and the cylinder, the output high voltage is supplied by a pair of terminals of a power supply, the safety apparatus comprises:

first means for sensing, to sense the impedance between the roller and the cylinder essentially independently of the values of the output high voltage and an output current, and to generate a first signal, indicating that the sensed impedance has fallen below a selected value;
said first means for sensing includes first and second voltage divider means selectively connected so as to generate said first signal between selected nodes thereof; and
means for switching connected in parallel with the output terminals of the power supply, said means for switching is adapted to sense said first signal and switch from a high impedance state to a low impedance state thereby applying a low impedance path between the terminals of the power supply reducing the output voltage between the roller and the cylinder on the press.

22. The safety apparatus according to claim 21, wherein said first means for sensing includes:

means for comparing two non-reference voltages to provide said first signal when the impedance between the two rolls drops below said selected value.

23. The safety apparatus according to claim 21, for use where the power supply has additionally a control input to control the operation of a high-voltage generator within the supply, said apparatus including further:

second means for sensing, to sense said first signal and to apply a control signal to the control input of the power supply to shut off the high voltage generator for a selected period of time.

24. A safety apparatus for use with a printing press to quickly reduce an output high voltage applied across an impression roller and a print cylinder with a web or a sheet material passing between the roller and the cylinder, the output high voltage is supplied by a pair of terminals of a power supply, the safety apparatus comprises:

first means for sensing, to sense the impedance between the roller and the cylinder essentially independently of the values of the output high voltage and an output current, and to generate a first signal, indicating that the sensed impedance has fallen below a selected value;
means for switching connected in parallel with the output terminals of the power supply, to sense said first signal and switch from a high impedance state to a low impedance state thereby applying a low impedance path between the terminals of the power supply reducing the output voltage between the roller and the cylinder on the press;

second means for sensing, capacitively coupleable to the load and adapted to sense a rate of change with respect to time of the voltage applied between the roller and the cylinder of the press to generate a second signal, indicating that a selected rate of change of voltage with respect to time has been exceeded;

said means for switching adapted to sense said second signal and quickly switch from said high impedance state to said low impedance state.

25. A safety apparatus for use with a printing press to quickly reduce a high voltage applied across an impression roller and a print cylinder with a web or a sheet material passing between the roller and the cylinder, the high voltage is supplied by a pair of terminals of a power supply, the safety apparatus comprises:

first means for sensing, to sense the impedance between the roller and the cylinder and to generate a first signal, indicating that the sensed impedance has fallen below a selected value; and means for switching connected in parallel with the output terminals of the power supply, to sense said first signal and switch from a high impedance state to a low impedance state thereby applying a low impedance path between the terminals of the power supply reducing the voltage between the roller and the cylinder on the press;

said first means for sensing includes means for comparing two non-reference voltages to provide said first signal when the impedance between the two rolls drops below said selected value; and said means for switching includes at least a first transistor, and associated means for biasing, to bias said transistor so that it operates in an avalanche mode, said transistor adapted to sense said first signal and to switch, in said avalanche mode and generate a selected signal.

26. The apparatus according to claim 25, wherein said means for switching includes:

a high voltage electronic switch with two high voltage terminals connected to the terminals of the high voltage supply and a means for control adapted to sense said selected signal and drive said high voltage electronic switch from said high impedance state to said low impedance state, thereby reducing the voltage across the terminals of the power supply essentially to zero volts.

27. An apparatus for sensing a load impedance, of a load connected to a power supply comprising:

sensor means for resistivity producing a voltage drop in a line connecting the load to the power supply;

means for comparing;

first voltage divider means for applying a part of a first non-reference voltage generated at a first end of said sensor means to an input of said means for comparing;

second voltage divider means for applying a part of a second non-reference voltage generated at a second end of said sensor means to a second input of said means for comparing;

said means for comparing compares said part of said first non-reference voltage to said part of said second non-reference voltage and generates a selected output signal essentially independently of the value of the output current to the load when the load impedance falls below a selected value.

28. An apparatus for sensing a load impedance of a load to which a voltage is applied comprising:

means for comparing;

first voltage divider means for generating and applying a first non-reference voltage selectively related to the load voltage to said means for comparing;

second voltage divider means for generating and applying a second non-reference voltage selectively related to the load voltage to said means for comparing;

said means for comparing compares said first non-reference voltage to said second non-reference voltage and generates a selected output signal essentially independently of the value of the output current to the load when the load impedance falls below a selected value.

29. For use with a high voltage power supply with a pair of high voltage output terminals and a controllable high voltage generator than can supply a selected high voltage and an output current to the output terminals, a system which will safely permit the application of the output high voltage in excess of 1 kilovolt to a varying impedance load, the apparatus comprising:

current limiting means with a fist terminal connected to one end of the load;

resistive means connected between a first high voltage terminal and a second terminal of said current limiting means;

means for sensing the load impedance essentially independently of the value of the output high voltage and output current, said means for sensing is connected in parallel with said resistive means;

said means for sensing includes first and second voltage divider means respectively connected between first and second ends of said resistive means and a reference node so as to generate a signal indicating that the load impedance has fallen below a selected value;

crowbar means, connected across the terminals of the power supply, adapted to sense the signal generated by said means for sensing the load impedance indicating that the load impedance has fallen below the selected value and to switch from a high impedance state to a low impedance state thereby reducing the high voltage at the terminals of the high voltage supply essentially to zero volts; and feedback means, connected between the one end of the load and a control input terminal of the high voltage supply, to close the loop and enable the high voltage supply to attempt to maintain a selected load voltage, provided that the load impedance has not fallen below the selected value.

30. The system according to claim 29, wherein:

a plurality of means to sense are connected, in parallel, to one another; and a plurality of crowbar means are connected in parallel to one another;

each of said means to sense the load impedance is connected to a corresponding one of said crowbar means.

31. The system according to claim 29, including further:

means to sense voltage variations at the load and to generate a signal indicating that a selected rate of change of load voltage with time has been exceeded;

said crowbar means adapted to sense said signal indicating that the selected rate of change of load voltage has been exceeded and to switch from said high impedance state to said low impedance state to reduce the output voltage from the power supply to essentially zero volts.

32. The system according to claim 31, including:

a plurality of means to sense voltage variations and a plurality of crowbar means;

each of said means to sense voltage variations is connected to a corresponding one of said crowbar means.

33. An apparatus to quickly reduce the voltage applied to a load connected to the output terminals of a power supply comprising:

means for sensing, to sense the impedance of the load essentially independent of load current;

said means for sensing includes first and second selectively connected voltage divider means;

means for generating, connected between said voltage divider means in said means for sensing, said means for generating is adapted to generate a first signal essentially independently of the value of the output voltage and current, indicating that the load impedance has fallen below a selected value; and means for switching connected in parallel with the output terminals of the power supply, to sense said first signal and to switch from a non-conducting state to a conducting state to quickly provide a low impedance path between the terminals of the power supply thereby reducing the voltage applied to the load.

* * * * *